US012709996B2

(12) United States Patent
Krehbiel et al.

(10) Patent No.: US 12,709,996 B2
(45) Date of Patent: Aug. 18, 2026

(54) SOUND-ATTENUATING DEVICES

(71) Applicant: Solar Turbines Incorporated, San Diego, CA (US)

(72) Inventors: William C. Krehbiel, Cardiff, CA (US); Gino Harris Granda, Bonita, CA (US); Daven Ng, Richmond, CA (US); Amir Saman Naseri, La Jolla, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 18/429,747

(22) Filed: Feb. 1, 2024

(65) Prior Publication Data

US 2025/0250922 A1 Aug. 7, 2025

(51) Int. Cl.

*F01D 25/30* (2006.01)
*F01N 13/00* (2010.01)
*F01N 13/20* (2010.01)

(52) U.S. Cl.

CPC ........... *F01D 25/30* (2013.01); *F01N 13/002* (2013.01); *F01N 13/20* (2013.01); *F05D 2260/96* (2013.01)

(58) Field of Classification Search

CPC .......... F01N 13/00; F01N 13/002; F01N 1/24; F01N 13/20; F02K 1/827; F02C 7/24; B64D 33/06; F01D 25/30; F05D 2260/96

See application file for complete search history.

(56) References Cited

U.S. PATENT DOCUMENTS 5,162,620 A * 11/1992 Ross ........................ F01D 25/30 181/220
5,715,672 A * 2/1998 Schockemoehl ....... F01D 25/30 60/39.5
6,035,964 A * 3/2000 Lange ..................... F01D 25/30 181/224
6,161,646 A * 12/2000 Curl ........................ F02K 1/827 181/258
6,263,998 B1 * 7/2001 Schockemoehl ....... F01D 25/30 181/224

(Continued)

FOREIGN PATENT DOCUMENTS

CN 211924331 U 11/2020

OTHER PUBLICATIONS

Written Opinion and International Search Report for Int'l. Patent Appln. No. PCT/US2025/011985, mailed Apr. 28, 2025 (14 pgs).

*Primary Examiner* — Alain Chau

(57) ABSTRACT

Systems including gas turbine engines generate exhaust, which may be expelled from the system in a manner that generates an undesirable sound pressure level. Accordingly, discussed herein is a solution to reduce the undesirable sound pressure level to a target sound pressure level at a predetermined distance from the exhaust-generating source. The sound-attenuating device used to reduce the sound pressure level comprises a first end having a first aperture, a second end having a second aperture, a sidewall extending between the first end and the second end, the sidewall having an inside surface and an outside surface. The sound-attenuating device further includes an interior transition region configured to reduce a sound pressure level, and a coupling region.

20 Claims, 15 Drawing Sheets

(56) References Cited

U.S. PATENT DOCUMENTS 7,448,133 B2 * 11/2008 Williams ................ F01D 25/30
29/889.1
7,530,427 B2 * 5/2009 Feist ....................... F01D 25/30
181/231
7,578,369 B2 * 8/2009 Francisco ............... F01D 25/30
244/1 N
8,037,966 B2 10/2011 Errera
8,230,967 B2 7/2012 Merchant
8,356,690 B2 * 1/2013 Wakatsuki .............. F01N 1/083
181/227
8,579,225 B2 * 11/2013 Mardjono ................. F02K 3/06
244/1 N
9,085,996 B2 * 7/2015 Ponnuraj ............... F01D 25/305
9,109,466 B2 * 8/2015 Lo ........................... F01D 25/30
9,109,800 B2 * 8/2015 Auzelyte .................. F23J 13/08
9,261,008 B2 * 2/2016 Mecuson ................ F01D 25/30
9,540,114 B2 * 1/2017 Nager .................... B64D 33/06
9,970,358 B2 * 5/2018 Yamato ................... F01D 25/30
12,116,913 B2 * 10/2024 Cazzolato ................. F01N 1/08
2005/0166809 A1 * 8/2005 Sixsmith ............... F04D 29/441
110/160
2006/0059674 A1 * 3/2006 Williams ................ F02K 1/827
29/469
2007/0284187 A1 * 12/2007 Feist ....................... F01D 25/30
181/256
2009/0057056 A1 * 3/2009 Baumgartner ............ F01N 1/04
181/259
2009/0078496 A1 * 3/2009 Francisco ................. F02C 7/24
181/213
2012/0085861 A1 * 4/2012 Mardjono ................. F02K 3/06
244/1 N
2012/0138384 A1 * 6/2012 Wakatsuki .............. F01N 13/20
181/227
2013/0019583 A1 * 1/2013 Lo ........................... F01D 25/30
60/39.5
2013/0091864 A1 * 4/2013 Auzelyte .................. F23J 13/08
29/888.021
2014/0157778 A1 * 6/2014 Ponnuraj ................. F01D 25/30
60/694
2015/0034412 A1 * 2/2015 Mecuson ................ F01D 25/30
181/256
2015/0377139 A1 * 12/2015 Yamato ................... F23R 3/002
60/725
2016/0001890 A1 * 1/2016 Nager ....................... F02C 7/24
181/296
2016/0177789 A1 * 6/2016 Honnorat ................ F01D 25/30
60/770
2016/0327064 A1 * 11/2016 Logue ....................... F02K 3/06
2017/0009654 A1 * 1/2017 Maier ..................... F02C 7/055
2018/0371951 A1 * 12/2018 Polcwiartek .............. F02C 7/24
2018/0371952 A1 * 12/2018 Drezek ................. F01D 25/305
2019/0063263 A1 2/2019 Davis et al.
2021/0239038 A1 8/2021 Jewhurst
2021/0317784 A1 * 10/2021 Yerram ..................... F01D 9/06
2022/0042431 A1 * 2/2022 Cazzolato ................. F01N 1/24
2022/0333503 A1 * 10/2022 Maddaleno ........... F01D 25/243

* cited by examiner

SOUND-ATTENUATING DEVICES

TECHNICAL FIELD

The embodiments described herein are generally directed to the attenuation of sound from industrial systems including gas turbine engine systems.

BACKGROUND

Noise-generating systems may produce sound waves that disturb the surrounding area and/or the team working in and around those systems. Systems such as those used in industrial systems for power generation, manufacturing, and the oil and gas industry may generate exhaust as a byproduct of operation. This exhaust may produce noise that can limit the operation of the system. Some solutions have employed noise-mitigating materials.

For example, U.S. Patent Publication 2021/239038, "Containerised Generator Set with External Exhaust Air Duct," discusses forming an exhaust air duct using a removable wall, air is drawn through the generating unit and past the engine, heated in a heat exchanger and exhausted on the outlet, the exhaust impinges on the removable wall and is guided vertically upward and baffled by sound absorbent material in the air duct. The exhaust air duct defined in part by the removable wall extends for at least most of a total height of the body of the container and is included within the container. In some instances, it may be desirable to further direct the exhaust gas.

The present disclosure is directed toward overcoming this and other challenges discovered by the inventors.

SUMMARY

In an embodiment, a sound-attenuating device, comprising: a first end having a first aperture; a second end having a second aperture; and a sidewall extending between the first end and the second end, the sidewall having an inside surface and an outside surface. The sound-attenuating device further comprises: an interior transition region configured to reduce a sound pressure level; and a coupling region.

In another embodiment according to the present disclosure, a system, comprising: an exhaust-generating device; a duct system including at least one duct, the at least one duct being coupled to the exhaust-generating device; and a sound-attenuating device coupled to the exhaust-generating device. In an embodiment, the sound-attenuating device comprises: a first end having a first aperture; a second end having a second aperture; and a sidewall extending between the first end and the second end, the sidewall having an inside surface and an outside surface. The sound-attenuating device further comprises an interior transition region configured to reduce a sound pressure level of the system; and a coupling region comprising a coupling mechanism, the sound-attenuating device being coupled to the exhaust-generating device via the coupling mechanism.

In an embodiment according to the present disclosure, a gas turbine system, comprising: a gas turbine engine; an exhaust system coupled to the gas turbine engine; and a sound-attenuating device coupled to and extending from the exhaust system. The sound-attenuating device comprises: a first end having a first aperture; a second end having a second aperture; a sidewall extending between the first end and the second end, the sidewall having an inside surface and an outside surface; and an interior transition region configured to reduce sound pressure levels emitted by the gas turbine system.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1A:
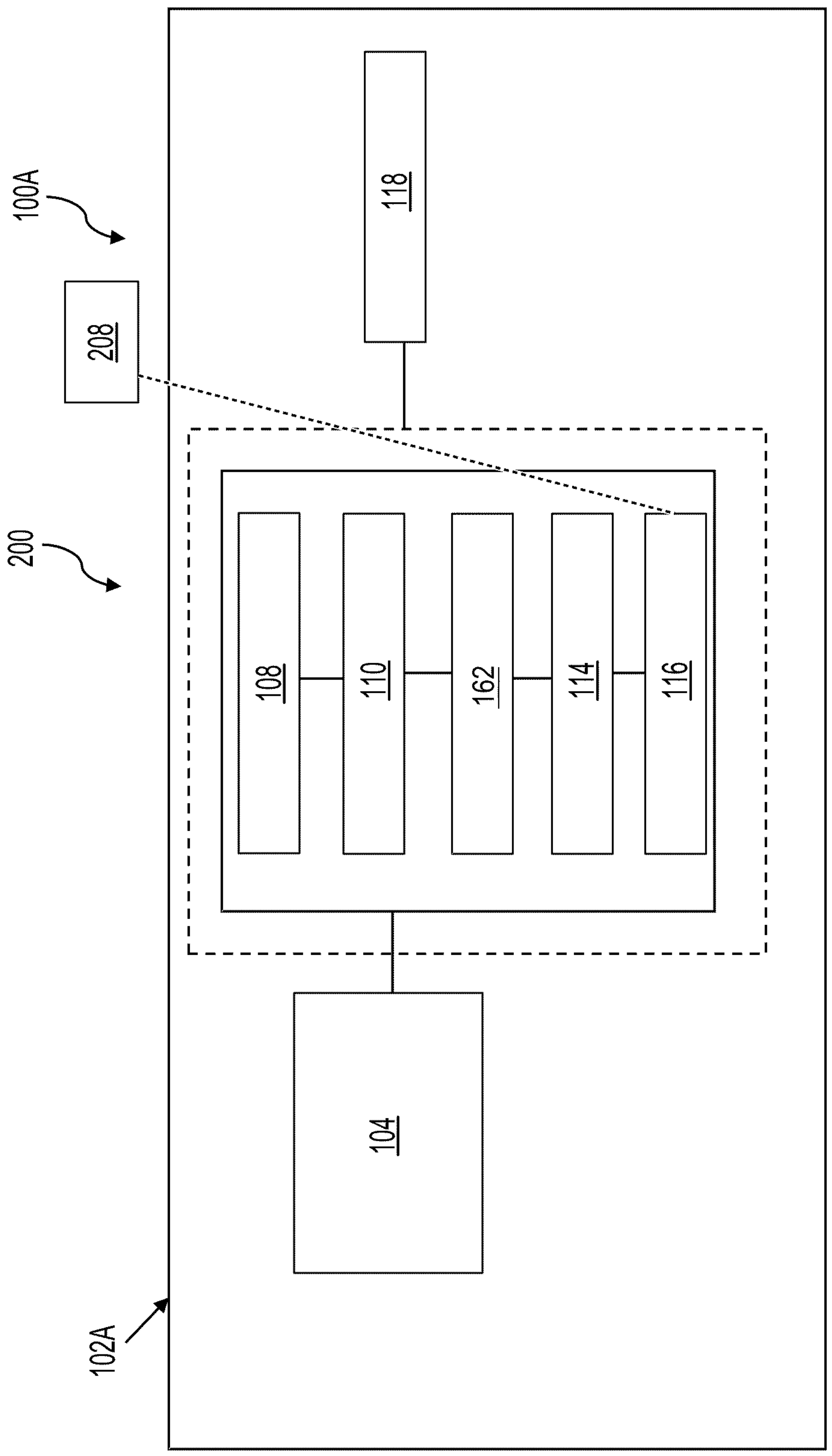
FIG. 1A illustrates a schematic diagram of a gas turbine engine, according to an embodiment of the present disclosure.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Unless specifically stated or obvious from context, as used herein, the term "about" is understood as within a range of normal tolerance in the art, for example within 2 standard deviations of the mean. "About" can be understood as within 10%, 9%, 8%, 7%, 6%. 5%, 4%, 3%, 2%, 1%, 0.5%, 0.1%, 0.05%, or 0.01% of the stated value. Unless otherwise clear from the context, all numerical values provided herein are modified by the term "about."

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground). As used herein, the term "respective" signifies an association between members of a group of first components and members of a group of second components (e.g., A1 and B1; A2 and B2; . . . . AN and BN).

As used herein, "coupled" is understood to mean two or more elements, features, devices, systems, and/or components, which can be attached, engaged, paired, and/or connected to each other communicatively, operatively, mechanically, magnetically, electrically, chemically, fluidly, or combinations thereof.

As used herein, "exhaust" is understood to mean a byproduct of a process such as combustion, and may include gaseous, particulate, and/or liquid elements.

As used herein, "removably coupled" is understood to mean two or more elements, devices, features, systems, and/or components, which can be coupled to each other and then uncoupled without harming the previously coupled components, such that removably coupled elements can be coupled and recoupled a predetermined number of times without negatively impacting the functionality of the elements, devices, features, systems, and/or components individually or of the coupled configuration.

As used herein, "permanently coupled" is understood to mean two or more elements, devices, systems, features, components, which can be coupled to each other and then uncoupled, such that permanently coupled elements cannot be uncoupled and recoupled without damaging and/or having to refurbish or repair at least one element, device, feature, system, and/or component.

As used herein, a "sound-attenuating device" is understood to mean an apparatus which, when coupled to a system, is configured to reduce a sound pressure level generated by the system, for example, the sound pressure level resulting from exhaust generation, by capturing and directing the exhaust in a predetermined direction.

It should also be understood that the various components illustrated herein are not necessarily drawn to scale. In other words, the features disclosed in various embodiments may be implemented using different relative dimensions within and between components than those illustrated in the drawings.

FIG. 1A illustrates a first example schematic diagram of a gas turbine engine 100A, according to examples of the present disclosure. In an embodiment, gas turbine engine 100A comprises an inlet 108, a compressor 110, a combustor 162, a turbine 114, and an exhaust system 116. A plurality of electronics 104 may be communicatively coupled to the gas turbine engine 100A and configured to control the operation of the gas turbine engine 100A. The plurality of electronics 104 may be further coupled to a fuel system 118 to operate and control the fuel system 118 which can be configured to deliver fuel to the combustor 162 of the gas turbine engine 100A. The plurality of electronics 104 may be wirelessly communicatively coupled to the gas turbine engine 100A via various wireless technologies.

A container 102A is positioned to encase the plurality of electronics 104, the gas turbine engine 100A (including at least the inlet 108, the compressor 110, the combustor 162, the turbine 114, the exhaust system 116), and the fuel system 118. An example of a sound-attenuating device 208 is shown as well as being coupled to the exhaust system 116 and is discussed in detail below.

In some examples, one or more, including potentially all, of the components of gas turbine engine 100A may be made from stainless steel and/or durable, high-temperature materials known as "superalloys." A superalloy is an alloy that exhibits excellent mechanical strength and creep resistance at high temperatures, and further exhibits good surface stability, and corrosion and oxidation resistance.

Inlet 108 may deliver a working fluid (e.g., the primary gas, such as air) into an annular flow path 120F around longitudinal axis 120C. Working fluid flows through inlet 108 into compressor 110. The working fluid may flow into inlet 108 from a particular direction and at an angle that is substantially orthogonal to longitudinal axis 120C. In one example, the inlet 108 may be configured to receive the working fluid from any direction and at any angle that is appropriate for the gas turbine engine 100A. While the working fluid will primarily be described herein as air, it should be understood that working fluid could comprise other fluids, including other gases, liquids, or combinations of gases and/or liquids.

Figure 1B:
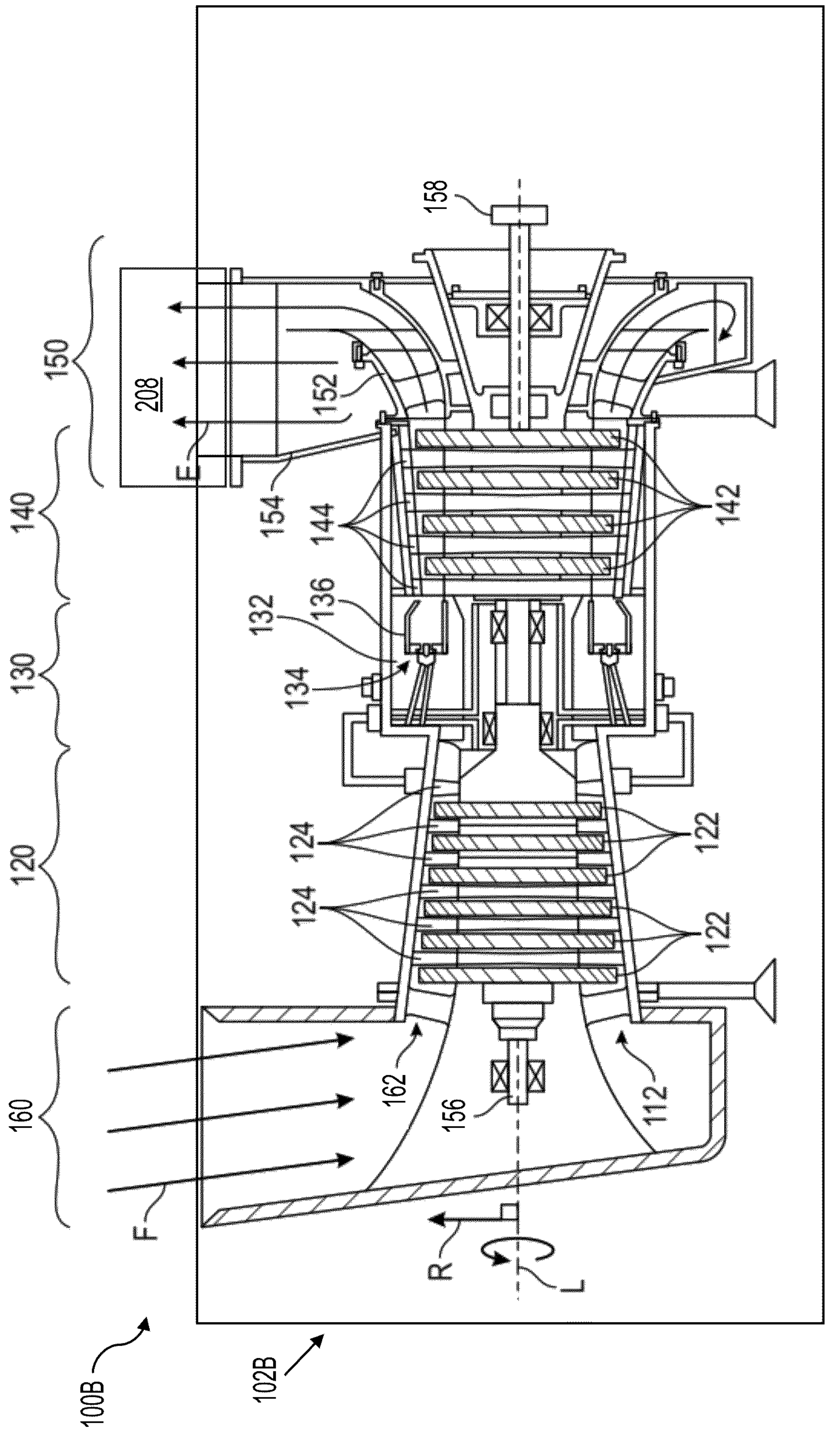
FIG. 1B illustrates another schematic diagram of a gas turbine engine, according to an embodiment of the present disclosure.

FIG. 1B illustrates a schematic diagram of a gas turbine engine 100B, according to an embodiment. A container 102B is shown as including at least the gas turbine engine 100B. Gas turbine engine 100B comprises a shaft 156 with a central longitudinal axis L. A number of other components of gas turbine engine 100B are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "radial" will refer to any axis or direction that is substantially perpendicular to longitudinal axis L, and the term "axial" will refer to any axis or direction that is substantially parallel to longitudinal axis L.

In an embodiment, gas turbine engine 100B comprises, from an upstream end to a downstream end, an inlet 160, a compressor 120, a combustor 130, a turbine 140, and an exhaust system 150 that may also be referred to as an "exhaust outlet." In addition, the downstream end of gas turbine engine 100B may comprise a power output coupling 158. One or more, including potentially all, of these components of gas turbine engine 100B may be made from stainless steel and/or durable, high-temperature materials known as "superalloys." A superalloy is an alloy that exhibits excellent mechanical strength and creep resistance at high temperatures, good surface stability, and corrosion and oxidation resistance.

Inlet 160 may funnel a working fluid F (e.g., the primary gas, such as air) into an annular flow path 112 around longitudinal axis L. Working fluid F flows through inlet 160 into compressor 120. While working fluid F is illustrated as flowing into inlet 160 from a particular direction and at an angle that is substantially orthogonal to longitudinal axis L, it should be understood that inlet 160 may be configured to receive working fluid F from any direction and at any angle that is appropriate for the particular application of gas turbine engine 100. While working fluid F will primarily be described herein as air, it should be understood that working fluid F could comprise other fluids, including other gases or combinations of gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The product of the combustion reaction drives turbine 140.

The fuel delivered to the combustor 130 may include diesel, heating oil, coke oven gas, JP5, jet propellant, or kerosene. In some embodiments, liquid fuels may also include natural gas liquids (such as, for example, ethane, propane, butane, etc.), paraffin oil-based fuels (such as, JET-A), and gasoline. Gaseous fuels may include natural gas. In one example, the fuel includes methane. In another example, the fuel includes hydrogen. In still other examples, the fuel includes a mix of methane and hydrogen. In some embodiments, the gaseous fuel may also include alternate gaseous fuels such as, for example, liquefied petroleum gas (LPG), ethylene, landfill gas, sewage gas, ammonia, biomass gas, coal gas, refinery waste gas, etc. This listing of liquid and gaseous fuels is not intended to be an exhaustive list but merely exemplary. In general, any liquid or gaseous fuel known in the art may be delivered to the combustor 130 through the fuel injectors 134.

Turbine 140 may comprise one or more turbine rotor assemblies 142 and stator assemblies 144 (e.g., nozzles). Each turbine rotor assembly 142 may correspond to one of a plurality or series of stages. In some examples, the turbine 140 includes one state. In other examples, the turbine 140 includes two stages. In yet other examples, the turbine 140 includes three or more stages. Turbine 140 extracts energy from the combusting fuel-gas mixture as it passes through each stage. The energy extracted by turbine 140 may be transferred via power output coupling 158 (e.g., to an external system), as well as to compressor 120 via shaft 156.

The exhaust E from turbine 140 may flow into exhaust system 150. Exhaust system 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust system 150 in a specific direction and at an angle that is substantially orthogonal to longitudinal axis L, it should be understood that exhaust system 150 may be configured to output exhaust E towards any direction and at any angle that is appropriate for the particular application of gas turbine engine 100. In some examples, the sound-attenuating device 208 is coupled to the exhaust collector 154 as discussed in detail herein.

Figure 2:
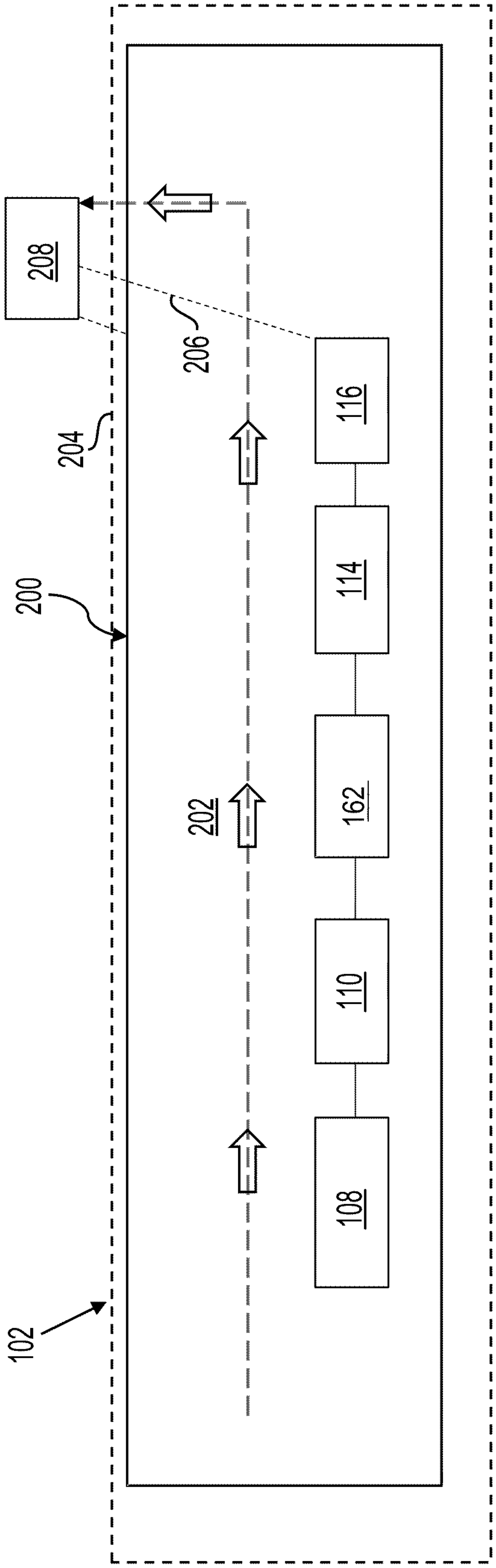
FIG. 2 illustrates a schematic diagram of airflow through a gas turbine engine, according to an embodiment of the present disclosure.

FIG. 2 is a schematic illustration of airflow through a gas turbine engine 200, according to embodiments of the present disclosure. The container 102, which may be similar to the containers 102A and 102B discussed above in FIGS. 1A and 1B, is positioned to include (encompass) a plurality of gas turbine engine components, as discussed above. In particular, the gas turbine engine 200 of FIG. 2 includes an inlet 108, a compressor 110, a combustor 162, a turbine 114, and an exhaust system 116. The exhaust generated by the processes, methods, and systems discussed herein flows through the exhaust system 116 to the sound-attenuating device 208. The sound-attenuating device 208 is fluidly coupled to the exhaust system 116, as shown by connecting line 206. In one example, the sound-attenuating device 208 is fluidly coupled to the gas turbine engine 200 by removably coupling the sound-attenuating device 208 to the container 102. In another example, the sound-attenuating device 208 is fluidly coupled to the gas turbine engine 200 by removably coupling the sound-attenuating device 208 to the exhaust system 116 via a duct, which is represented here by the connecting line 206. The fluid coupling promotes the transport of the exhaust in a predetermined direction. The sound-attenuating device 208 is configured to promote exhaust removal from the gas turbine engine 200 either via coupling it to the container 102, the exhaust system 116, or by a combination of couplings. Once coupled, the sound-attenuating device 208 reduces a sound pressure level generated by the exhaust from a first level measured at a first distance in a predetermined direction prior to coupling, to a second level measured at the first distance in the same predetermined direction, e.g., the two or more sound pressure level measurements are taken at substantially the same predetermined distance from and direction relative to the gas turbine engine 200. As discussed herein, a "sound pressure level (SPL)" is a pressure level of a sound, such as exhaust, that can be measured in decibels (dB), where the pressure level is a pressure deviation from an ambient pressure, such as atmospheric pressure.

Figure 3A:
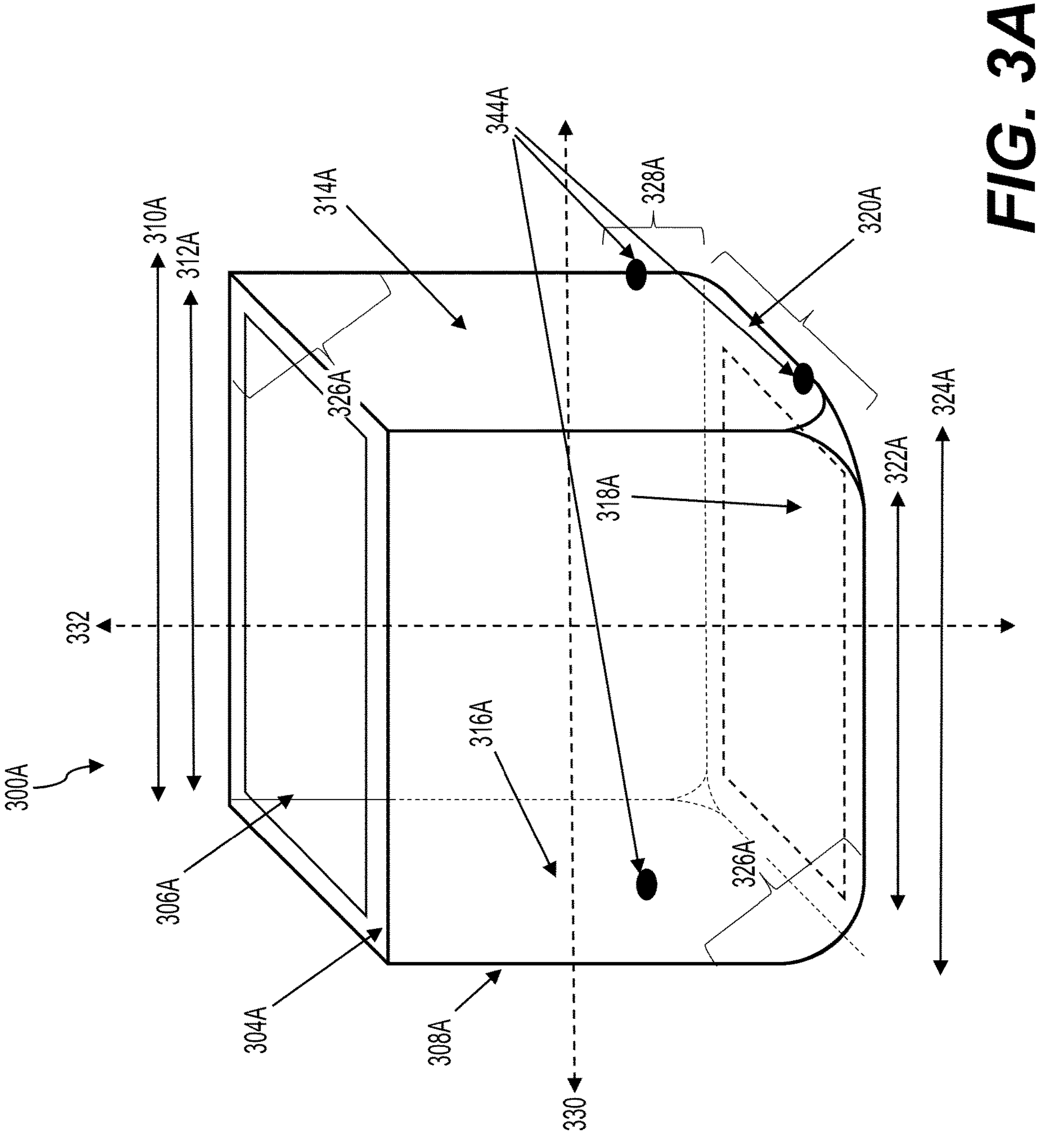
FIGS. 3A and 3B illustrate schematic drawings of a sound-attenuating device, according to embodiments of the present disclosure.
Figure 3B:
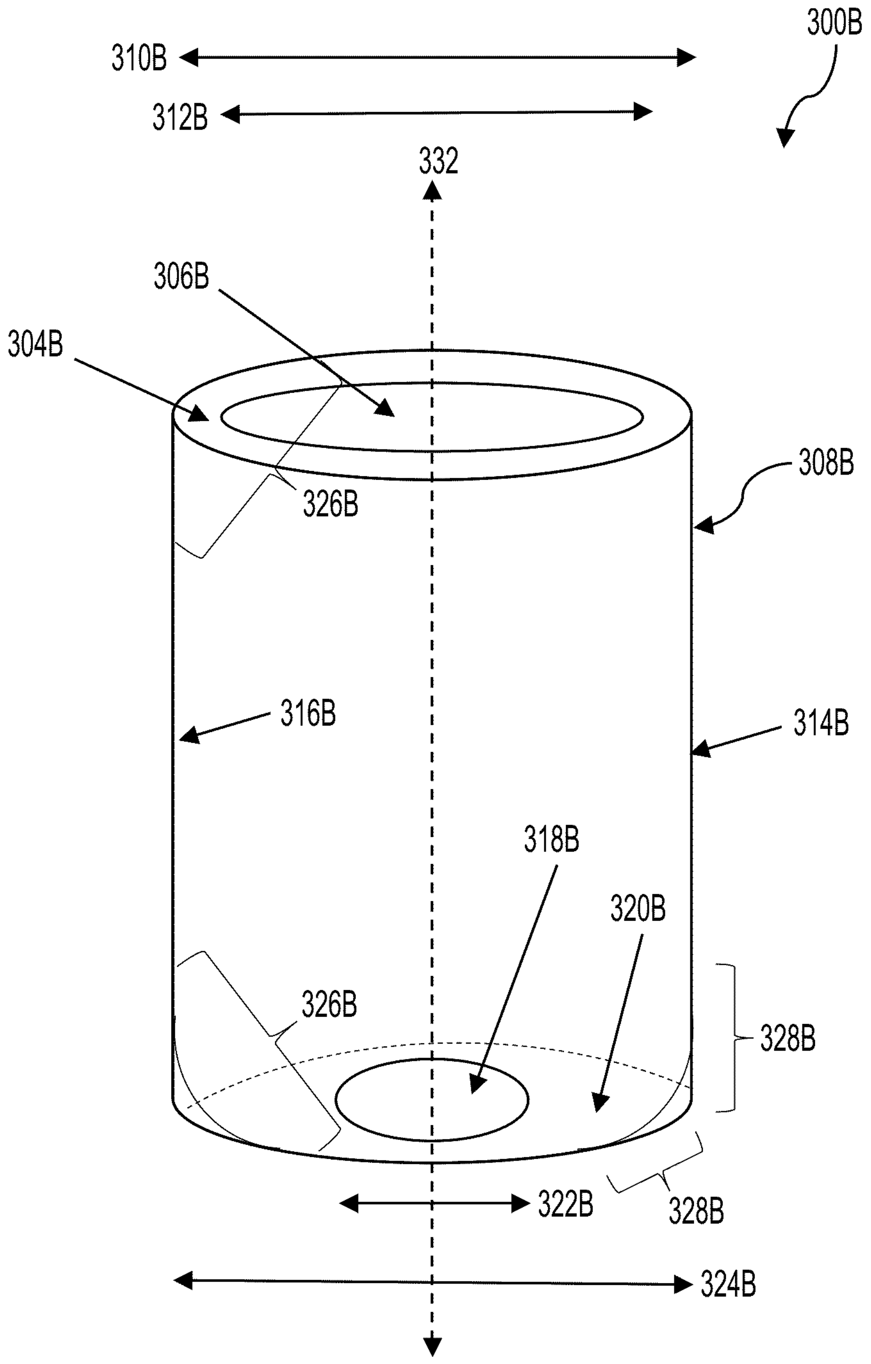

FIGS. 3A and 3B illustrate schematic drawings of example sound-attenuating devices 300A and 300B according to embodiments of the present disclosure. FIG. 3A illustrates a polygonal sound-attenuating device 300A and FIG. 3B illustrates an example of a cylindrical sound-attenuating device 300B. It is contemplated that combinations of geometries discussed in FIGS. 3A and 3B may be employed in some examples discussed herein.

The sound-attenuating device 300A includes a first end 304A opposite a second end 320A, and a central axis 332. A first aperture 306A in the first end 304A and a second aperture 318A in the second end 320A are co-located along the central axis 332 to form a fluid flow path along which exhaust exits an exhaust system as discussed herein. The first end 304A has a first diameter 310A, and the first aperture 306A is associated with a first aperture diameter 312A. In one example, the first aperture diameter 312A is less than the first diameter 310A of the first end 304A. The second end 320A has a second diameter 324A, and the second aperture 318A is associated with a second aperture diameter 322A. In one example, the second aperture diameter 322A is less than a second end diameter 324A of the second end 320A.

In some examples, the fluid flow path is from the second end 320A to the first end 304A, such that the second end 320A would be coupled to an exhaust-generating source such as the exhaust systems discussed herein. In some examples, due to the apertures (306A, 318A) in each respective end (304A, 320A), the first end 304A may be referred to as a "first surface" and the second end 320A may be referred to as a "second surface," such that the apertures (306A, 318A) do not extend across the entire first diameter 310A nor the second diameter 324A.

A sidewall 308A extends from the first end 304A to the second end 320A, having an exterior sidewall surface 314A and an interior sidewall surface 316A. An interior transition region 326A, and other interior transition regions discussed herein, may be configured to capture, direct, and release, for example, exhaust gas, reducing the sound pressure level of the exhaust gas emission from a first level to a second level at a predetermined distance from the gas turbine engines as discussed above. The interior transition region 326A may be configured to generate a lamellar flow of the exhaust. As used herein, the terms "exhaust" and "exhaust gas" may be used interchangeably to refer to what is produced by a gas turbine engine. In some examples, the interior transition region 326A and/or other interior transition regions discussed herein include smooth surfaces that promote lamellar flow of the exhaust gas.

In one example, the sound-attenuating device 300A has an interior transition region 326A that forms a parabolic cross-sectional shape. In other examples, the sound-attenuating device 300A has an interior transition region 326A that forms an elliptical or partial-elliptical (e.g., because the ends (304A, 320A) include apertures (306A, 318A)) cross-section. In still other examples, the interior transition region 326A includes a plurality of smooth surfaces in the internal corners of the sound-attenuating device 300A to produce lamellar flow of the exhaust gas out of the sound-attenuating device 300A. In one example, the interior transition region 326A is formed where the interior sidewall surface 316A meets the second end 320A. In some examples, the interior transition region 326A additionally, alternatively, or optionally includes a region where the interior sidewall surface 316A meets the first end 304A. In still other examples, the interior transition region includes the entire interior sidewall surface 316A which may be a smooth surface configured to promote lamellar flow out of the sound-attenuating device.

The sound-attenuating device 300A further includes one or more coupling regions 328A. The one or more coupling regions 328A are configured to secure the sound-attenuating device 300A to an exhaust duct or other system where it may be desirable to capture, direct, and release exhaust or other matter to reduce the sound pressure level experienced at a predetermined distance 346 from the gas turbine engine. In some examples, the one or more coupling regions 328A comprise one or more coupling mechanisms 344A. In one example, the coupling region 328A includes a plurality of coupling mechanisms 344A positioned circumferentially around the sidewall 308A, for example, around the exterior sidewall surface 314A of the sidewall 308A. The one or more coupling mechanisms 344A are configured to removably and fluidly couple the sound-attenuating device 300A to the gas turbine engine systems as discussed herein mechanically, magnetically, chemically, electrically, or combinations thereof. In one example, the coupling region 328A is positioned on the outside surface 314A of the sidewall 308A. In another example, the coupling region 328A is positioned through the sidewall 308A, including having coupling mechanisms 344A positioned through the sidewall 308A partially (in a recess but without a through-hole) or completely (through-hole). The one or more coupling mechanisms 344A may be positioned on either or both of the interior sidewall surface 316A, the exterior sidewall surface 314A, through the sidewall 308A, on the first end 304A, or on other surfaces or features of the sound-attenuating device 300A.

FIG. 3B shows sound-attenuating device 300B includes a first end 304B opposite a second end 320B, a central axis 332 is co-located with a first aperture 306B in the first end 304B and a second aperture 318B in the second end 320B to form a fluid flow path. The first end 304B has a first diameter 310B, and the first aperture 306B is associated with a first aperture diameter 312B, the first aperture diameter 312B being less than the first diameter 310B of the first end 304B. The second end 320B has a second diameter 320B, and the second aperture 318B is associated with a second aperture diameter 322B, the second aperture diameter 322B being less than a second end diameter 324B of the second end 320B.

In some examples, the fluid flow path is from the first end 304B to the second end 320B. In other examples, the fluid flow path is from the second end 320B to the first end 304B. In some examples, due to the apertures (306B, 322B) in each respective end (304B, 320B), in some examples, the first end 304B may be referred to as a "first surface" and the second end 320B may be referred to as a "second surface." A sidewall 308B extends from the first end 304B to the second end 320B, having an exterior sidewall surface 314B and an interior sidewall surface 316B. An interior transition region 326B is formed where the interior sidewall surface 316B meets the second end 320B. In some examples, the interior transition region 326B additionally, alternatively, or optionally includes a region where the interior sidewall surface 316B meets the first end 304B. In still other examples, the interior transition region includes the entire interior sidewall surface 316B which may be a smooth surface configured to promote lamellar flow out of the sound-attenuating device. The interior transition region 326B may be configured to capture, direct, and release, for example, exhaust gas, reducing the sound pressure level of the exhaust gas emission from a first level to a second level at a predetermined distance from the gas turbine engines as discussed above.

The sound-attenuating device 300B further includes one or more coupling regions 328B. The one or more coupling regions 328B may include one or more coupling mechanisms 344B. The one or more coupling mechanisms 344B are configured to removably and fluidly couple the sound-attenuating device 300B to the gas turbine engine systems as discussed herein mechanically, magnetically, chemically, electrically, or combinations thereof. The one or more coupling mechanisms 344B may be positioned on either or both of the interior sidewall surface 316B, the exterior sidewall surface 314B, through the sidewall 308B, on the first end 304B, or on other surfaces or features of the sound-attenuating device 300B. The one or more coupling regions 328B are configured to secure the sound-attenuating device 300B to an exhaust duct or other system where it may be desirable to capture, direct, and release exhaust or other matter to reduce the sound pressure level experienced at a predetermined distance from the gas turbine engine.

Figure 3C:
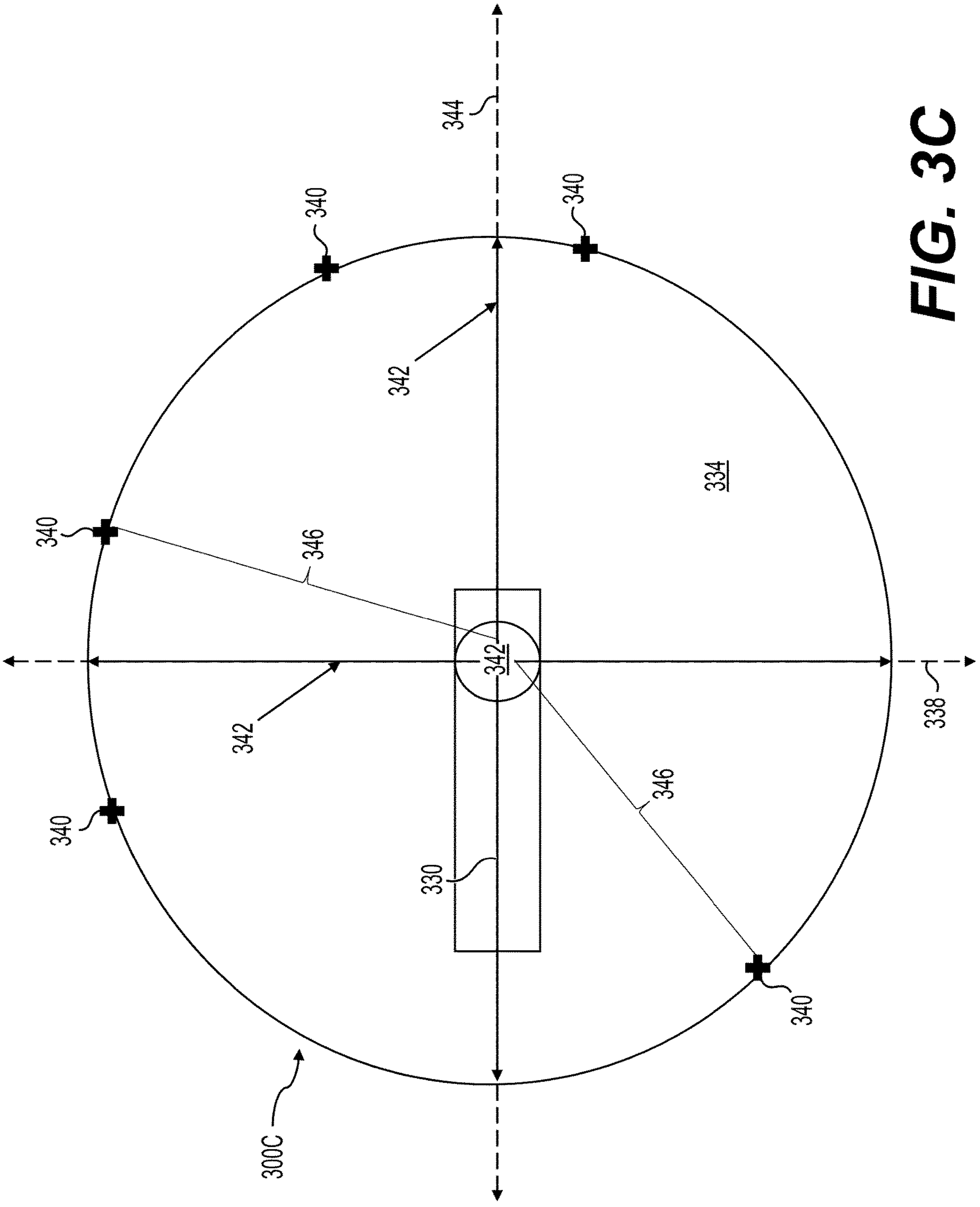
FIG. 3C illustrates an example of measurement regions for measuring sound pressure level reduction using the sound-attenuating devices according to embodiments of the present disclosure.

FIG. 3C illustrates an example of a measurement region 300C that may be used as a reference for measuring a plurality of sound levels with and without use of the sound-attenuating devices discussed herein to determine a sound pressure level reduction resulting from the use of the sound-attenuating devices discussed herein. FIG. 3C is a top-down view of a gas turbine engine system 330 including a sound-attenuating device 342 as discussed herein. While the gas turbine engine system 330 is shown as having a rectangular cross-sectional footprint in FIG. 3C, in other examples, the gas turbine engine system 330 may have a footprint having other polygonal, circular, triangular, elliptical, or other geometries or combinations of geometries. The sound-attenuating device is shown as having a circular cross-sectional top view in FIG. 3C, in other examples, the sound-attenuating device 342 may have other polygonal (including square and rectangular), triangular, elliptical, or other top-view geometries or combinations of top-view geometries.

A measurement region 334 is shown in FIG. 3C. The measurement region 334 is an example zone along a perimeter of which sound pressure level measurements may be taken. In this example, the measurement region 334 is centered on a position of the sound-attenuating device 342 as shown by the first axis 344 and the second axis 338. In other examples, the measurement region may be centered based upon one or more surfaces of the gas turbine engine system 330, or a container including the gas turbine engine system 330 as discussed herein. In any embodiment, the measurements for sound-attenuation are taken in substantially the same position(s) for consistency and accuracy. Sound pressure level measurements may be taken both with and without the use of the sound-attenuating device 342, or other sound-attenuating devices discussed herein. This may be done to determine a sound pressure level reduction with the use of the sound-attenuating device 342. In other examples, the sound pressure level measurement(s) may be taken only when the sound-attenuating device 342 is in use. This may be done, for example, to confirm compliance with regional, local, city, state, federal, or other noise ordinances or other ordinances.

In one example, the measurement region 334 may have a diameter 336, as measured along either the first axis 344 or the second axis 338 from about 0.5 miles to about 10 miles or more. In other examples, the measurement region 334 may have a diameter 336 as measured along either the first axis 344 or the second axis 338 from about 1.5 miles to about 5 miles. In still other examples, the measurement region 334 may have a diameter 336 as measured along either the first axis 344 or the second axis 338 from about 1.5 miles to about 5 miles. In still other examples, the measurement region 334 may have a diameter 342 as measured along either the first axis 344 or the second axis 338 from about 2 miles to about 7 miles. In other examples, the diameter 342 may be on a smaller scale, such that it is measurable in feet. In this example, the diameter 342 may be from about 6 feet to about 500 feet. In another example, the diameter 342 may be from about 6 feet to about 250 feet. In still another example, the diameter 342 may be from about 20 feet to about 100 feet.

The measurement region 334 as well as a position 340 along that region, indicated here as multiple non-limiting example position options, may depend on one or more factors. The position 340 may be positioned along the measurement region 344 and measured at a radius 346 of the measurement region 334. The position 340 may be determined by factors including a location of a population and/or access to the gas turbine engine system 330, for example, if a walkway or road is positioned within the (circumference of the) measurement region 334. In other examples, the predetermined distance may be measured at a plurality of positions 340 on the circumference of a region surrounding the gas turbine engine system 330. In some examples, one or more positions 340 may be used (for example, averaged) to determine the reduction in sound pressure level.

As discussed herein, the position 340 at a predetermined distance 346 at which sound pressure levels may be measured from a midpoint of the container including the exhaust system, as discussed above. The predetermined distance 346 may range from about 0.25 miles to about 5 miles. In another example, the predetermined distance 346 may range from about 0.5 miles to about 2.5 miles. In yet another example, the predetermined distance 346 may range from about 1 mile to about 3.5 miles. In still other examples, the predetermined distance 346 may be less than 0.25 miles or greater than 5 miles depending upon the diameter 342 of the measurement region 334.

Figure 4A:
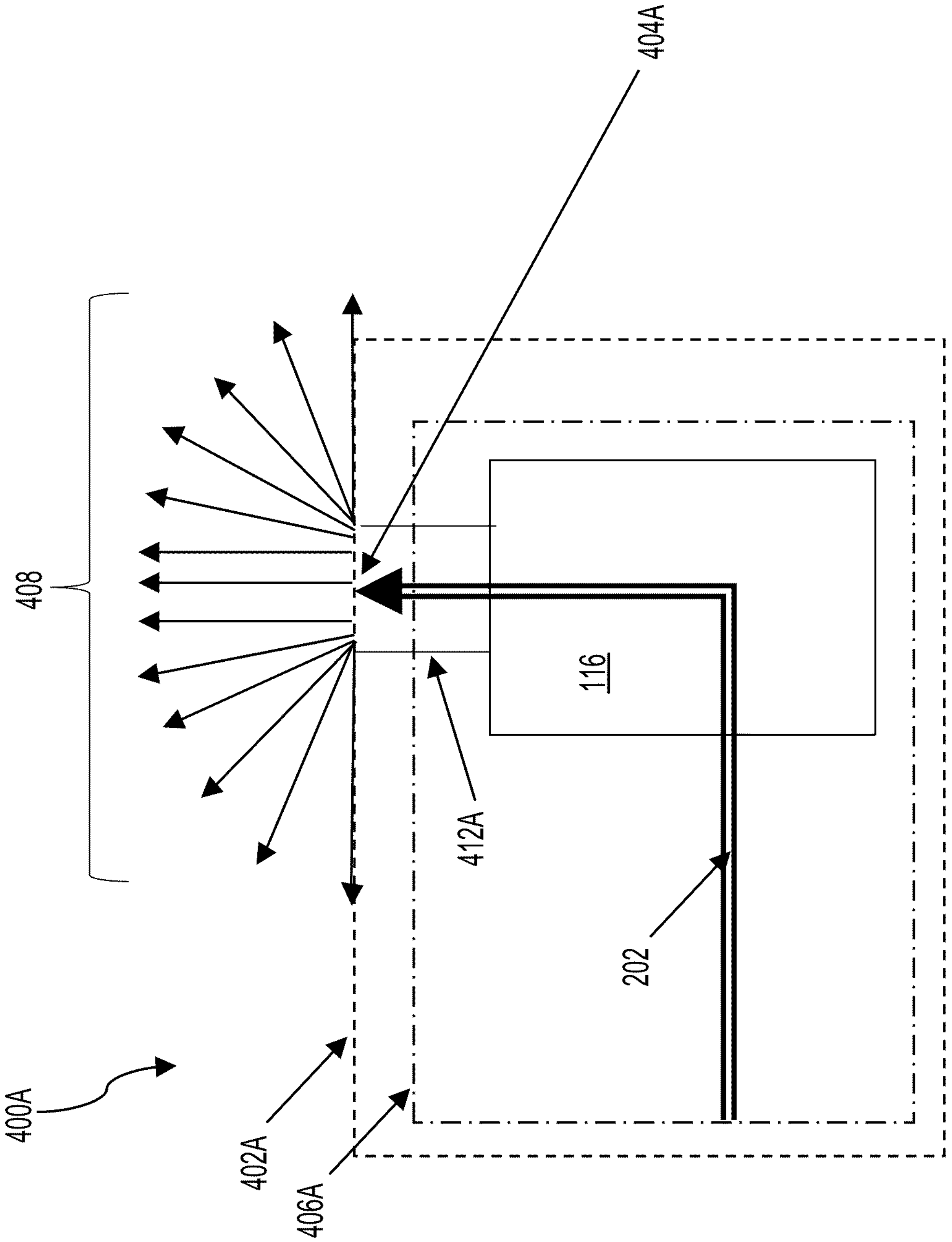
FIGS. 4A and 4B illustrate partial schematic drawings of a system with and without a sound-attenuating device, according to embodiments of the present disclosure.
Figure 4B:
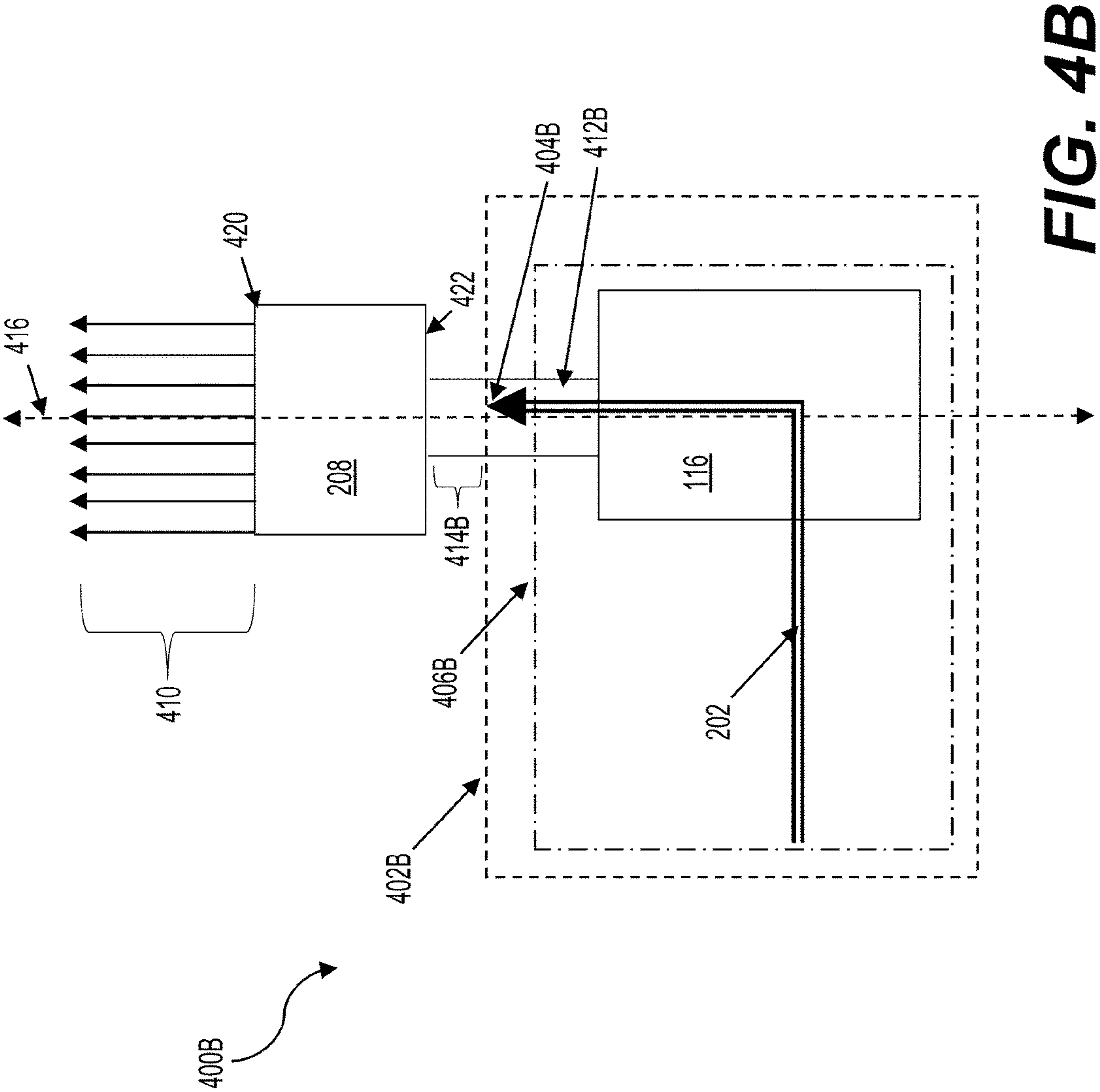

FIGS. 4A and 4B are partial schematic illustrations of gas turbine engine systems 400A and 400B, with and without, respectively, the sound-attenuating device 208. FIG. 4A shows a gas turbine engine system 400A, including a container 402A, a partial view of a gas turbine engine 406A, as well as a direction of airflow 202 through the exhaust system 116, as discussed above. The exhaust system 116 includes at least one exhaust duct 412A that is fluidly coupled to the container 402A via an aperture 404A which may also be referred to as the exhaust outlet 404A. As shown in FIG. 4A, where a sound-attenuating device is not employed, the plurality of sound waves 408 exiting the container 402A do so in a mushroom or rainbow-like formation, exposing the container 402A to damage and degradation, and exposing those in proximity to the gas turbine engine system 400A to noise and/or possibly other irritants.

In contrast to the gas turbine engine system 400A, the gas turbine engine system 400B includes the sound-attenuating device 208. The gas turbine engine system 400B includes a container 402B, a partial view of a gas turbine engine 406B, as well as the direction of airflow 202 through the exhaust system 116 as discussed above. The exhaust system 116 includes at least one exhaust duct 412B that is fluidly coupled to the container 402B via an aperture 404B which may also be referred to as the exhaust outlet 404B. The sound-attenuating device 208 is fluidly and removably coupled to the exhaust duct 412B via the aperture 404B. In contrast to FIG. 4A, where no sound-attenuating device 208 is used, the plurality of sound waves 410 exiting the container 402B do so in a predetermined direction, away from the container 402B, thus protecting the container 402B from exhaust-related damage. In the example in FIG. 4B, the plurality of sound waves 410 are shown to be directed along the central axis 416, perpendicular to the container 402B, and thus away from the container 402B, which not only reduces the sound pressure level at a predetermined distance from the container 402B, but which also reduces the degradation of the container 402B and/or elements of the exhaust system (e.g., 412B, 404B, or other elements).

Furthermore, the sound pressure level emitted via the gas turbine engine system 400A as measured at a predetermined distance from the gas turbine engine system 400B is reduced to a second sound pressure level emitted by the gas turbine engine system 400B when measured at the same predetermined distance by the sound-attenuating device 208. The sound-attenuating device 208 is shown in FIG. 4B as being rectangular, this is illustrative and the various geometries of the sound-attenuating device 208 are discussed below at least in FIGS. 5A-5E and 6A-6E. The sound-attenuating device 208 can be fabricated and assembled to be removably and fluidly coupled to the exhaust duct 412B to direct the exhaust in a predetermined direction. In some examples, the sound-attenuating device 208 may be adjustable to direct the exhaust gas in more than one direction, depending upon the example.

The sound-attenuating device 208 may be formed from one or more metals or alloys such as stainless steel, carbon sheet metal steel which may or may not be painted or otherwise coated, or a superalloy, such as a nickel (Ni)-based or cobalt chrome (CoCr)-based superalloy. The sound-attenuating device 208 can be formed via a variety of methods including sand casting, investment casting, machining, welding/brazing, metal forming, and other fabrication and machining operations or combinations of fabrication and/or machining operations. In some examples, the inside surface and/or the outside surface of the sound-attenuating device 208 may be coated with one or more metallic, ceramic, polymer, or other materials. In some examples, the inside surface of the sound-attenuating device includes a baffling material to further reduce the sound pressure level. In one example, neither the inside surface nor the outside surface of the sound-attenuating device 208 includes a sound-baffling material. In some examples, the sound-attenuating device 208 may be lined inside with perforated sheet metal. In this example, insulation such as steel wool may be used in combination with the perforated sheet metal. In another example, the sound-attenuating device 208 may be lined inside with perforated sheet metal. In this example, insulation such as fiberglass and/or basalt may be used in combination with the perforated sheet metal.

In one example, a first material may be used for the inside surface of the sound-attenuating device 208 and a second, different material may be used for its outside surface. By "different," the second material may include a different composition, a different finishing method, or other aspects that differ from the first material. In another example, a single material, for example, stainless steel, may be used to form the sound-attenuating device 208.

In some examples, a lofting element 414B may be removably coupled to the sound-attenuating device to provide a longer flow path for the exhaust air flow 202. The lofting element 414B or other lofting elements discussed herein may share a central axis 416 with an exhaust duct, as shown in FIG. 4B. In other examples, the lofting element 414B may have a central axis (not shown here) that is at an angle relative to the central axis 416. This angle may be from about 5° to about 85°. In another example, the lofting element 414B may have a central axis (not shown here) that is at an angle relative to the central axis from about 15° to about 75°. In another example, the lofting element 414B may have a central axis (not shown here) that is at an angle relative to the central axis from about 30° to about 50°. In another example, the lofting element 414B may have a central axis (not shown here) that is at an angle relative to the central axis of about 45°. The lofting element 414B, or other lofting elements discussed herein, may be based on the sound-attenuation desired for the related surrounding area.

As discussed herein, the lofting element 414B or other lofting elements discussed herein may include one or more components. The one or more components may be permanently or removably coupled to the sound-attenuating device 208 or other sound-attenuating devices discussed herein. In another example, the lofting element 414B may be formed integrally as a part of the sound-attenuating device 208. The lofting element 414B may be used, for example, due to the type (composition) of exhaust being generated, the volume of exhaust being generated, the velocity of the exhaust being generated, the temperature of the exhaust generated, the configuration of the sound-attenuating device 208, or other factors or combinations of factors. The lofting element 414B may be removably coupled to the sound-attenuating device 208. In other examples, the lofting element 414B may be permanently coupled to the sound-attenuating device 208. In yet other examples, the lofting element 414B may be formed integrally as a part of the sound-attenuating device 208. In some examples, the lofting element 414 may be from about 10% to about 90% of a height 418 of the sound-attenuating device 208. The height 418 of the sound-attenuating device 208 may be measured in the same direction as airflow between a first end 420 and a second end 422, along central axis 416. the lofting element 414 may be from about 10% to about 90% of a height of the sound-attenuating device 208. The sound-attenuating devices discussed herein may have various internal and external geometries, as discussed in detail below.

Figure 5B:
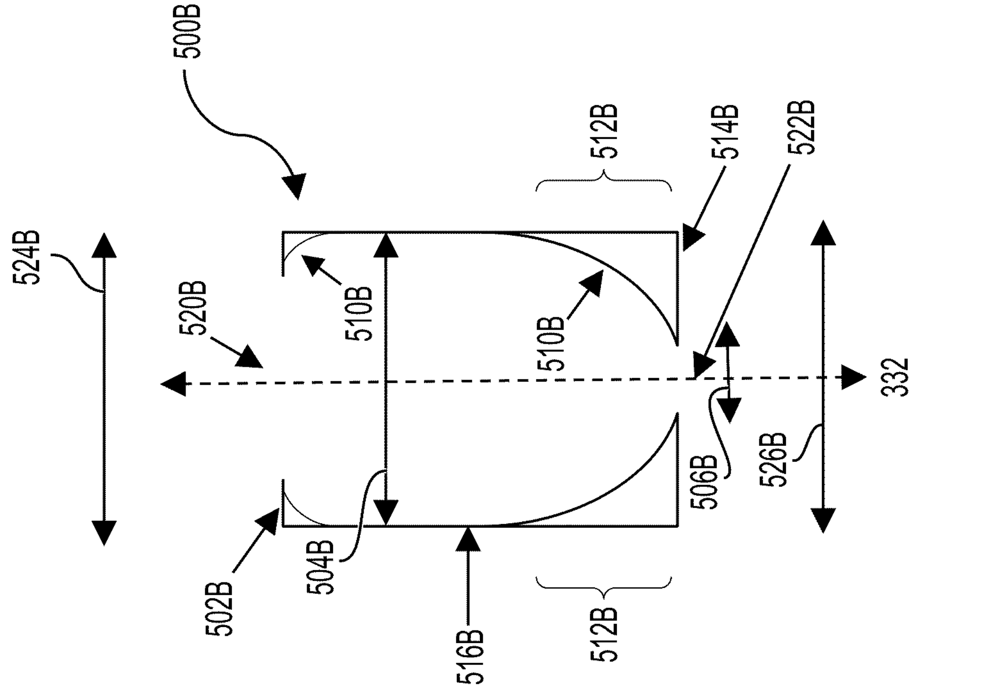
FIGS. 5A-5E illustrate schematic cross-sectional drawings of a sound-attenuating device, according to embodiments of the present disclosure.
Figure 5A:
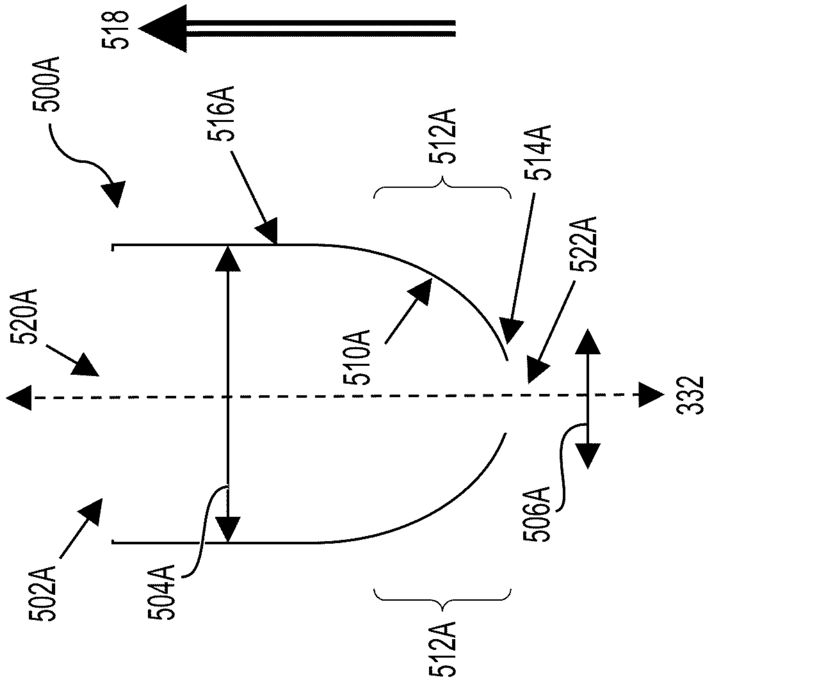

FIGS. 5A-5E illustrate cross-sectional drawings of sound-attenuating devices (500A-500E), according to embodiments of the present disclosure. FIG. 5A shows a first example sound-attenuating device 500A. The sound-attenuating device 500A may be described as having a "U-shaped" cross-section. For example, the sound-attenuating device 500A includes a smooth interior transition region 510A, a first end 502A, a second end 514A opposite the first end 502A, and a central axis 332. As discussed herein, the first end (e.g., 502A or other first end discussed herein) of the sound-attenuating devices (including 500A) defines a first end of the sound-attenuating device as discussed in at least FIGS. 3A, 3B, and 4B, and the second end (e.g., 514A or other second ends discussed herein) of the sound-attenuating devices (including 500A) discussed herein defines a second end of the sound-attenuating device as discussed in at least FIGS. 3A, 3B, and 4B.

The sound-attenuating device 500A further includes a sidewall 516A extending between the first end 502A and the second end 514A, and a coupling region 512A. The interior transition region 510A may, in some examples, be described as a parabolic cross-section. In some examples, the interior transition region 510A is configured to be a smooth transition, as compared to an angular or bumpy/ridged/textured (not smooth) transition or a transition having a blasted or other three-dimensional surface with enhanced surface area, to promote sound attenuation. The sound-attenuating device 500A has a first aperture diameter 504A at or near the first end 502A and a second aperture diameter 506A at the second end 506A. In some examples as discussed herein, the first aperture 520A in the sound-attenuating device 500A and the second aperture 522A in the sound-attenuating device 500A are sized and positioned to promote airflow in the direction as shown in 518. As shown in FIG. 5A, the first aperture diameter 504A may be greater than the second aperture diameter 506A. In one example, the first aperture diameter 504A may be greater than the second aperture diameter 506A such that the ratio of the first aperture diameter 504A to the second aperture diameter 506A is from about 15:1 to about 2:1. In another example, the first aperture diameter 504A may be greater than the second aperture diameter 506A such that the ratio of the first aperture diameter 504A to the second aperture diameter 506A is from about 12:1 to about 4:1. In yet another example, the first aperture diameter 504A may be greater than the second aperture diameter 506A such that the ratio of the first aperture diameter 504A to the second aperture diameter 506A is from about 9:1 to about 5:1.

FIG. 5B shows another example sound-attenuating device 500B. The sound-attenuating device 500B may be described as having a "box-U-shaped" cross-section having a parabolically-shaped inside surface formed by features including the interior transition region 510B discussed herein. For example, the sound-attenuating device 500B includes a smooth interior transition region 510B, a first end 502B, a second end 514B opposite the first end 502B, and a central axis 332. A sidewall 516B extends between the first end 502B and the second end 514B, and a coupling region 512B are also shown. The interior transition region 510A may, in some examples, be described as a parabolic cross-section. The sidewall 516B has a different cross-section (e.g., polygonal) as compared to the U-shaped interior transition region 510B.

In contrast to the sound-attenuating device 500A in FIG. 5A, the sound-attenuating device 500B has a polygonal external cross-sectional geometry including the sidewall 516B, the first end 502B and the second end 514B, and an interior transition region 510B. The interior transition region 510B is smooth and may, in some examples, be described as a parabolic cross-section as discussed in FIG. 5A. In addition, as shown in FIG. 5B, the interior transition region 510B includes an optional transition region extending from the sidewall 516B to the first end 502B. The sound-attenuating device 500B has a first aperture diameter 504B of the first aperture 520B at the first end 502B and a second aperture diameter 506B of the second aperture 522B at the second end 514B. In some examples as discussed herein, the first aperture diameter 504B is a diameter of a first aperture 520B in the sound-attenuating device 500B. In one example, the interior transition region 510B is not present at the first end 502B and instead the first aperture 520B has a diameter 504B that is substantially the same as the overall maximum width 524B of the sound-attenuating device 500B as measured at the first end 502B.

In some examples as discussed herein, the first aperture diameter 504B is a diameter of a first aperture 520B in the sound-attenuating device 500B and the second aperture diameter 506B is a diameter of a second aperture 522B in the sound-attenuating device 500B to promote airflow in the direction as shown in 518. As shown in FIG. 5B, the first aperture diameter 504B may be greater than the second aperture diameter 506B. In one example, the first aperture diameter 504B may be greater than the second aperture diameter 506B such that the ratio of the first aperture diameter 504B to the second aperture diameter 506B is from about 15:1 to about 2:1. In another example, the first aperture diameter 504B may be greater than the second aperture diameter 520B such that the ratio of the first aperture diameter 504B to the second diameter 506B is from about 12:1 to about 4:1. In yet another example, the first aperture diameter 504B may be greater than the second aperture diameter 520B such that the ratio of the first aperture diameter 504A to the second aperture diameter 506A is from about 9:1 to about 5:1.

Figure 5D:
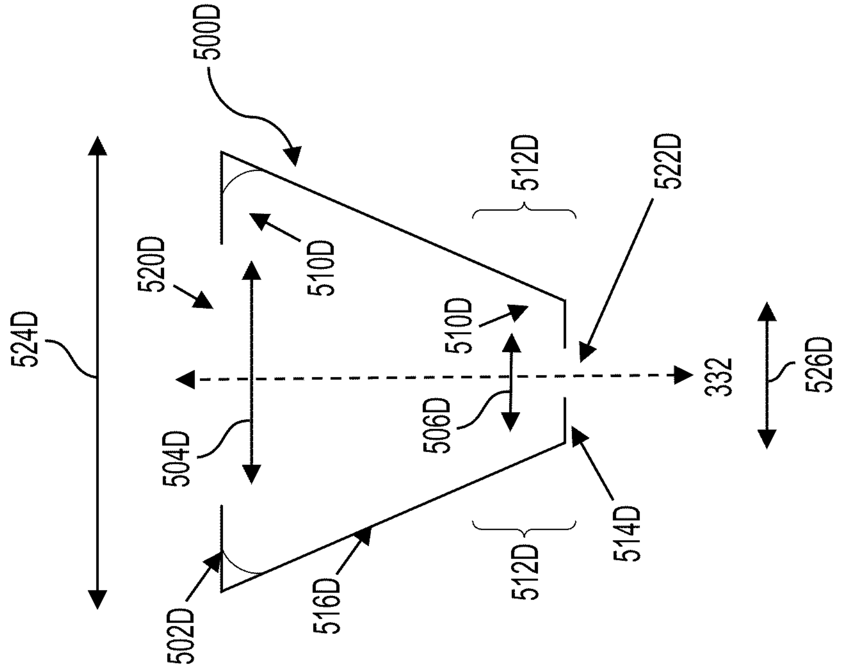
Figure 5C:
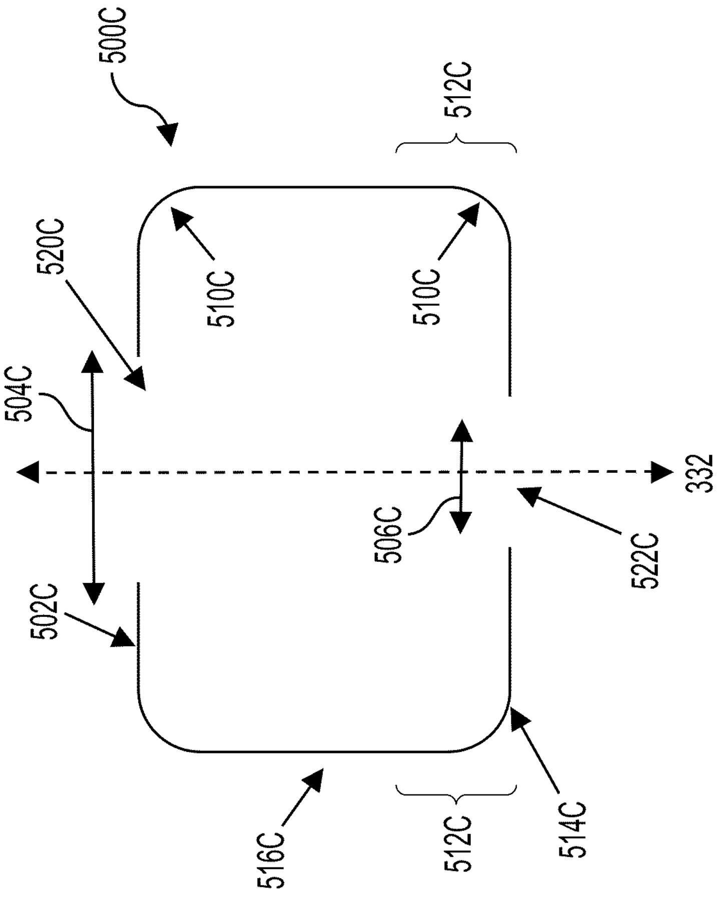

FIG. 5C shows another example a sound-attenuating device 500C. The sound-attenuating device 500C may be described as having a "rounded polygonal" cross-section, such that an interior transition region 510C includes areas between each of a sidewall 516C and a first end 502C and the sidewall 516C and the second end 514C. A coupling region 512C is also shown. As discussed herein, the coupling regions, including the coupling region 512C, may include one or more coupling mechanisms along the sidewall 516C, and/or the second end 514C. As shown herein, the sidewall 516C is perpendicular to each of the first end 502C and the second end 514C.

The sound-attenuating device 500C has a first aperture diameter 504C of the first aperture 520C at the first end 502C and a second aperture diameter 506C of the second aperture 522C is at the second end 514C. In some examples as discussed herein, the first aperture diameter 504C is a diameter of a first aperture 520C in the sound-attenuating device 500C. The interior transition region(s) 510C promotes the sound-attenuation of exhaust passing through the sound-attenuating device 500C. As shown herein, the interior transition region 510C is smooth, and configured to direct the exhaust to the first aperture 520C. In the example shown in FIG. 5C, the interior transition region 510C has a cross-section of a polygon with rounded corners which comprise the interior transition region 510C. In one example, the interior transition region 510C includes a region between the second end 514C and the sidewall 516C. In another example, as shown in FIG. 5C, the interior transition region 510C includes an optional transition region extending from the sidewall 516C to the first end 502C.

As shown in FIG. 5C, the first aperture diameter 504C may be greater than the second aperture diameter 506C. In one example, the first aperture diameter 504C may be greater than the second aperture diameter 506C such that the ratio of the first aperture diameter 504C to the second aperture diameter 506C is from about 15:1 to about 2:1. In another example, the first aperture diameter 504C may be greater than the second aperture diameter 506C such that the ratio of the first aperture diameter 504C to the second aperture diameter 506C is from about 12:1 to about 4:1. In yet another example, the first aperture diameter 504C may be greater than the second aperture diameter 506C such that the ratio of the first aperture diameter 504C to the second aperture diameter 506C is from about 9:1 to about 5:1.

FIG. 5D shows another example of a sound-attenuating device 500D. The sound-attenuating device 500D can be described as having a "rounded triangular" interior cross-section. In one example, the interior transition region 510D includes a region between the second end 514D and the sidewall 516D. In another example, as shown in FIG. 5D, the interior transition region 510D includes an optional transition region extending from the sidewall 516D to the first end 502D. The sidewall 516D has a triangular exterior cross-section as shown, which may or may have sharp, rounded, or otherwise-shaped corners in contrast to the smooth interior transition region 510D. The sound-attenuating device 500D has a coupling region 512D, first aperture diameter 504D of a first aperture 520D at or near the first end 502D and a second diameter 506D at a second aperture 522D of the second end 506D. In some examples as discussed herein, the first aperture diameter 504D is a diameter of a first aperture 520D in the sound-attenuating device 500D. In one example, the first aperture diameter 504D is less than an overall maximum width 524D of the sound-attenuating device 500D. In other sound-attenuating device examples discussed herein, each of the apertures in the first end 502D and the second end 514D may be of varying sizes, up to and including an entire width of the sound-attenuating device 500D as measured at the widest point in either or both the first end 502D or the second end 514D.

The interior transition region(s) 510D promotes the sound-attenuation of exhaust passing through the sound-attenuating device 500D. As shown in FIG. 5D, the first aperture diameter 504D may be greater than the second diameter 506D. In one example, the interior transition region 510D is not present at the first end 502D and instead the first aperture 520D has a diameter 504D that is substantially the same as the overall maximum width 524D of the sound-attenuating device 500D as measured at the first end 502D.

In one example, the first aperture diameter 504D may be greater than the second aperture diameter 506D such that the ratio of the first aperture diameter 504D to the aperture diameter 506D is from about 15:1 to about 1:1. In another example, the first aperture diameter 504D may be greater than the second diameter 506D such that the ratio of the first aperture diameter 504D to the second aperture diameter 506D is from about 12:1 to about 2:1. In yet another example, the first aperture diameter 504D may be greater than the second aperture diameter 506D such that the ratio of the first aperture diameter 504D to the second aperture diameter 506D is from about 9:1 to about 4:1.

Figure 5E:
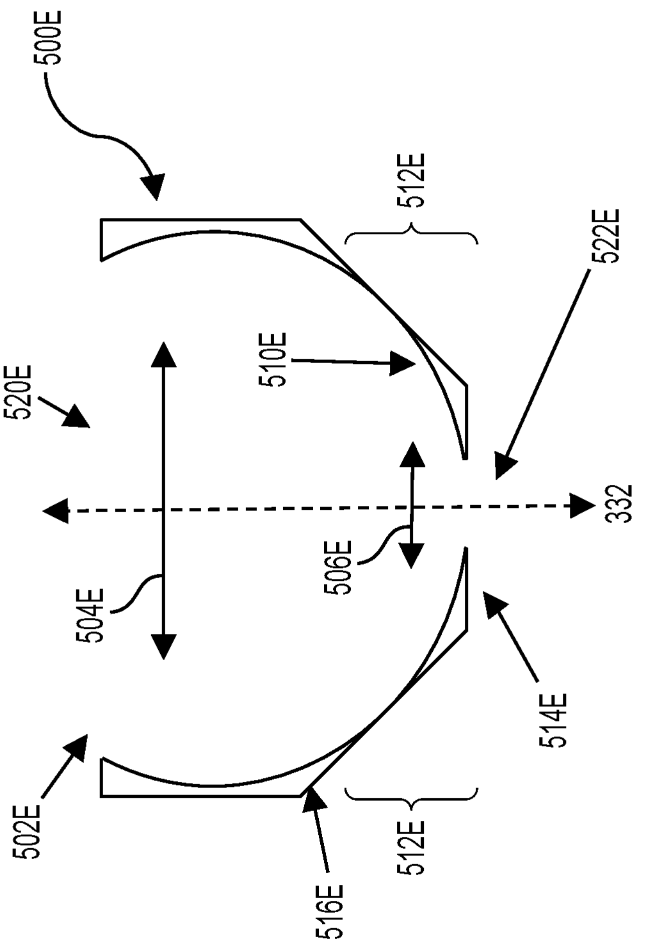

FIG. 5E shows another example of a sound-attenuating device 500E. The sound-attenuating device 500E can be described as having a "polygonal" exterior cross section, as shown by a sidewall 516E, and a rounded, which may also be described as elliptical, interior cross section, which includes an interior transition region 510E. In one example, the interior transition region 510E includes a region between the second end 514E and the sidewall 516E. In FIG. 5E as well as other examples discussed herein, the interior transition region 510E extends circumferentially around the sound-attenuating device 500E. In another example, as shown in FIG. 5E, the interior transition region 510E includes an optional transition region extending from the sidewall 516E to the first end 502E. The interior transition region 510E is smooth and promotes the sound-attenuation of exhaust as discussed herein.

The sound-attenuating device 500E has a coupling region 512E, a first aperture diameter 504E of an aperture 520E at or near the first end 502E and a second aperture diameter 506E of an aperture 522E at or near the second end 506E.

In other sound-attenuating device examples discussed herein, each of the apertures in the first end and the second end may be measured at the widest point of the sound-attenuating device. In some examples, the widest point of the sound-attenuating device may be in either or both of the first end 502E or the second end 506E. The interior transition region(s) 510E promotes the sound-attenuation of exhaust passing through the sound-attenuating device 500E.

As shown in FIG. 5E, the first aperture diameter 504E may be greater than the second diameter 506E. In one example, the first aperture diameter 504E may be greater than the second aperture diameter 506E such that the ratio of the first aperture diameter 504E to the aperture diameter 506E is from about 15:1 to about 1:1. In another example, the first aperture diameter 504E may be greater than the second diameter 506E such that the ratio of the first aperture diameter 504E to the second aperture diameter 506E is from about 12:1 to about 2:1. In yet another example, the first aperture diameter 504C may be greater than the second aperture diameter 506E such that the ratio of the first aperture diameter 504E to the second aperture diameter 506E is from about 9:1 to about 4:1. The sound-attenuating devices of FIGS. 5A-5E do not include lofting elements as discussed above. Examples of sound-attenuating devices including lofting elements are discussed below.

FIGS. 6A-6E show the sound-attenuating devices of FIGS. 5A-5E, each including a lofting element, a lofting element aperture, and a lofting coupling region that may be included instead of or in addition to the coupling regions discussed in at least FIGS. 5A-5E. The sound-attenuating device bodies discussed in FIGS. 6A-6E may be similar to the sound-attenuating devices discussed in FIGS. 5A-5E. The lofting elements discussed herein may be similar to the lofting element 414B discussed in FIG. 4B above.

Figure 6B:
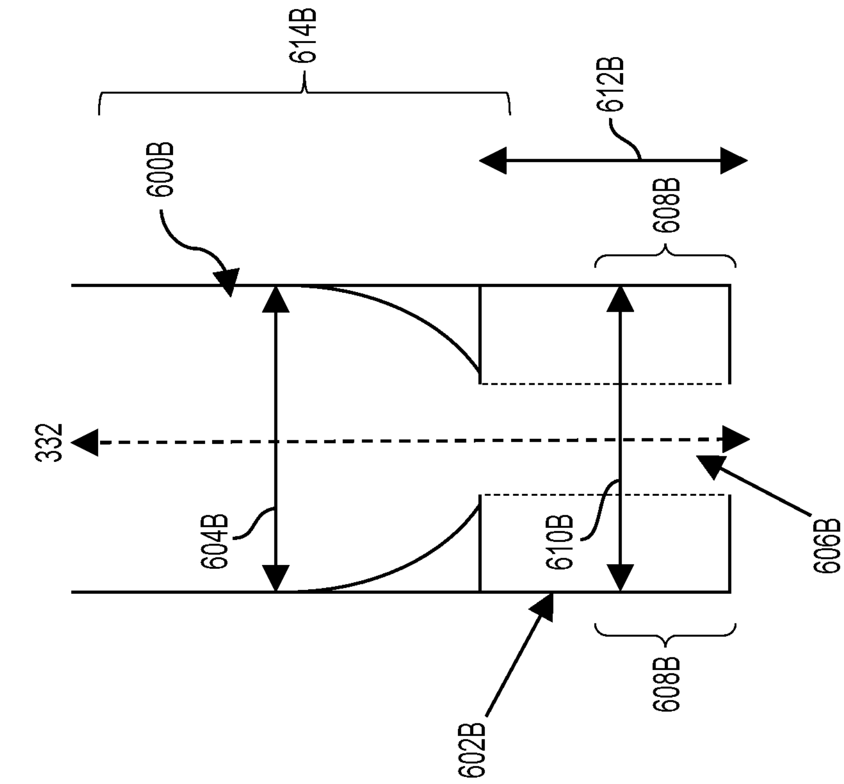
FIGS. 6A-6E illustrate schematic cross-sectional drawings of a sound-attenuating device including a lofting element, according to embodiments of the present disclosure.
Figure 6A:
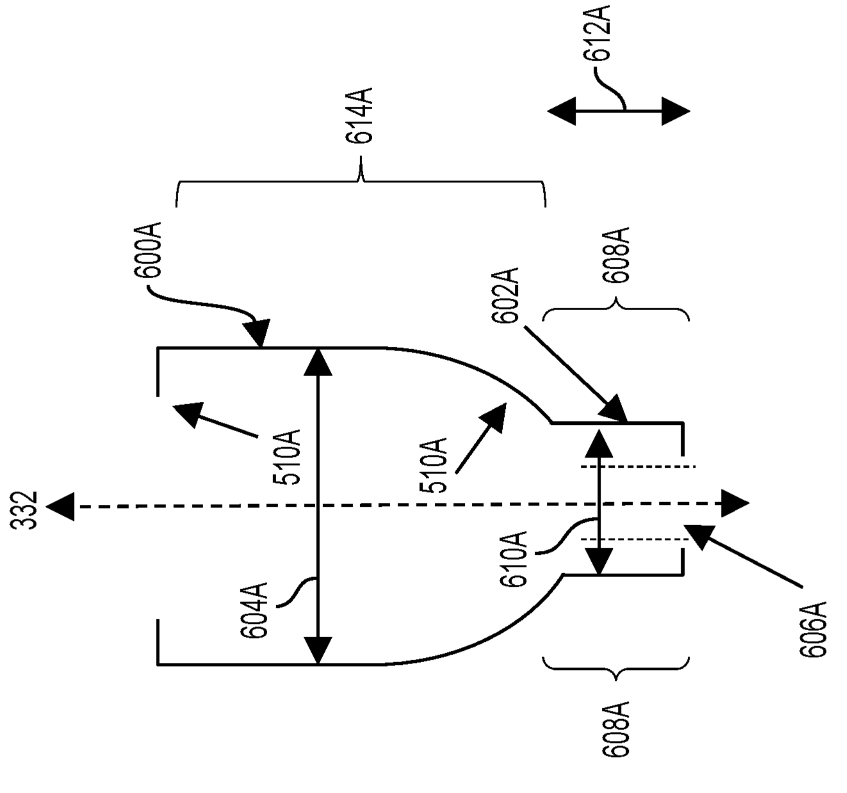

FIG. 6A shows a sound-attenuating device 600A, which includes a body 614A. The body 614A has the same features as discussed above in the sound-attenuating device of 500A discussed in FIG. 5A above but is referred to as such herein to distinguish embodiments including a lofting element from those that may not include a lofting element. The lofting element 602A, and other lofting elements discussed herein, may be removably coupled, permanently coupled, or formed integrally with the body 614A. Regardless of whether the lofting element 602A (or other lofting elements as discussed herein) is removably coupled, permanently coupled, or formed integrally with the body 614A, it is fluidly coupled to the body 614A to allow exhaust gas to pass therethrough for sound attenuation. In an example where the lofting element 602A is removably coupled to the sound-attenuating device, the removable coupling may include mechanical, magnetic, chemical, adhesive, electrical, or combinations of coupling means.

The lofting element may have a height 612A and a width 610A. In one example, the height 612A is determined based on one or more factors such as a height of the body 614A, a temperature of the exhaust gas, a volume of the exhaust gas, or a velocity of the exhaust gas. In one example, the width 610A is determined based on one or more factors such as the 610A of the body 614A, a temperature of the exhaust gas, a volume of the exhaust gas, or a velocity of the exhaust gas. The lofting element 602A further includes an aperture 606A extending along the central axis 332 thorough the lofting element 602A and the body 614A such that the lofting element 602A is fluidly coupled to the body 614A to allow exhaust to pass through for sound-attenuation. In one example, as shown in FIG. 6A, the width 610A is less than a largest diameter 604A of the sound-attenuating device 600A. In other examples, as discussed herein, the width 610A is greater than a largest diameter 604A of the sound-attenuating device 600A. In other examples, as discussed herein, the width 610A is the same as a largest diameter 604A of the sound-attenuating device 600A. While the lofting elements discussed in FIGS. 6A-6E are shown to be positioned along the central axis 332, in other examples not shown here, the lofting elements may be at an angle relative to the central axis 332. In another example, the lofting elements discussed herein may be configured at an angle of about 90 degrees relative to a surface of the container (not shown here) to which the sound-attenuating device is coupled.

The lofting element 602A may further include a coupling region 608A, including one or more coupling mechanisms (not shown here) which may be positioned in various locations on the lofting element. Similar to the coupling mechanisms discussed above with respect to FIGS. 5A-5E, the lofting element 602A may include mechanical, magnetic, chemical, electric, adhesive, or other means of coupling. The lofting coupling region 608A may be used instead of or in addition to the coupling regions on the sound-attenuating device body 614A, as discussed in FIGS. 5A-5E, to secure the sound-attenuating device 600A to an exhaust system. The lofting element 602A may have various cross-sectional shapes. As shown in FIG. 6A, the lofting element 602A has a polygonal, in this example square, cross-sectional shape. In other examples, the lofting element 602A, or other lofting elements as discussed herein may have other polygonal, triangular, elliptical, or combination shaped cross-sections.

FIG. 6B shows a sound-attenuating device 600B which includes a body 614B. The body 614B has the same features as discussed above in the sound-attenuating device of 500B discussed in FIG. 5B above but is referred to as such herein to distinguish embodiments of sound-attenuating devices including a lofting element from those that may not include a lofting element. A lofting element 602B may be removably coupled, permanently coupled, or formed integrally with the body 614B. The lofting element may have various heights 612B and widths 610B. The height 612B and width 610B may be determined as discussed above in FIG. 6A and may further depend on a cross-sectional geometry of the interior transition regions discussed herein. The lofting element 602B further includes an aperture 606B extending the height 612B thorough the lofting element 602B such that the lofting element 602B is fluidly coupled to the body 614B to allow exhaust to pass through. In one example, as shown in FIG. 6B, the width 610B is the same as a largest diameter 604B of the sound-attenuating device 600B. In other examples, as discussed herein, the width 610B is greater than a largest diameter 604B of the sound-attenuating device 600B. In other examples, as discussed herein, the width 610B is smaller than a largest diameter 604B of the sound-attenuating device 600B.

The lofting element 602B may further include a coupling region 608B, including one or more coupling mechanisms (not shown) which may include mechanical, magnetic, chemical, electric, adhesive, or other means of coupling. The lofting coupling region 608B may be used instead of or in addition to the coupling regions discussed in FIGS. 5A-5E to secure the sound-attenuating device 600B to an exhaust system, as discussed above. The lofting element 602B may have various cross-sectional shapes. As shown in FIG. 6B, the lofting element 602B has a polygonal, in this example square, cross-sectional shape. In other examples, the lofting element 602B, or other lofting elements as discussed herein may have other polygonal, triangular, elliptical, or combination shaped cross-sections.

Figure 6D:
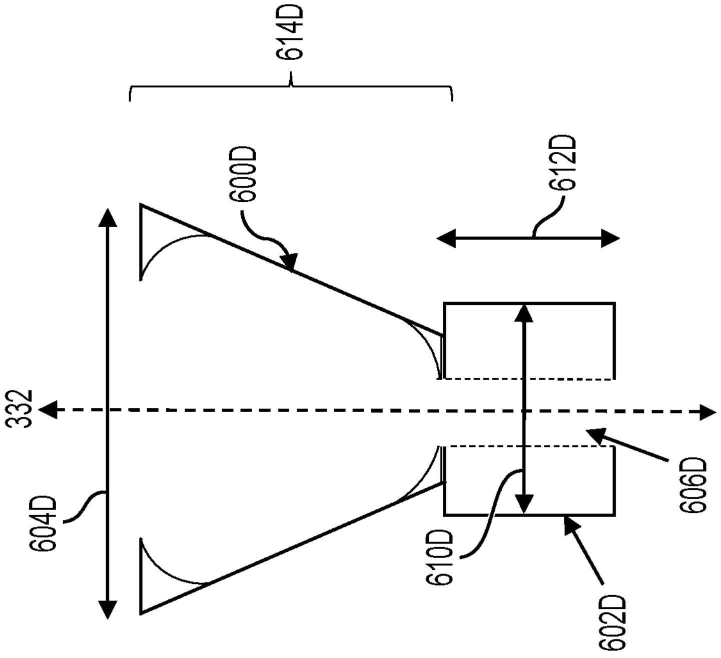
Figure 6C:
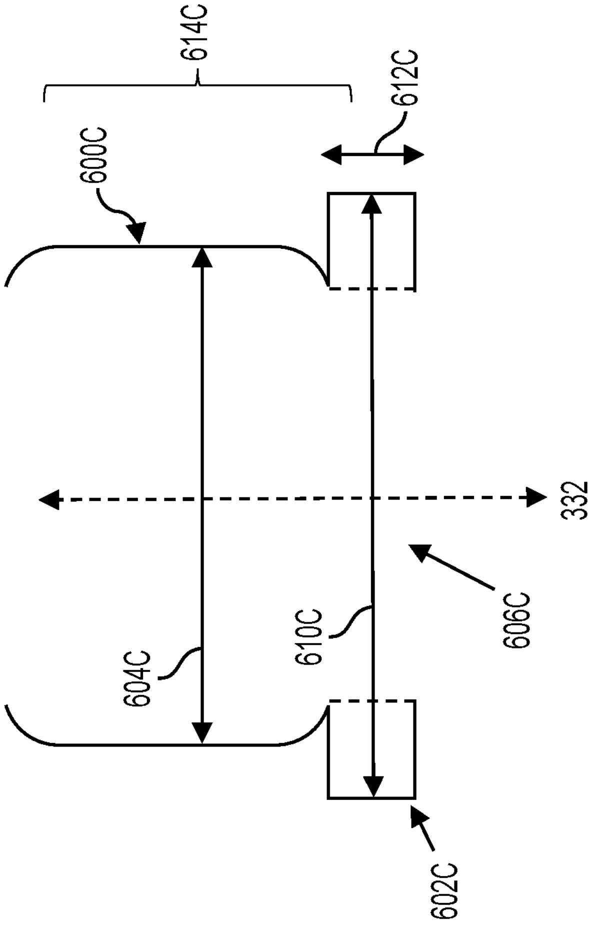

FIG. 6C shows a sound-attenuating device 600C which includes a body 614C. The body 614C has the same features as discussed above in the sound-attenuating device of 500C discussed in FIG. 5C above but is referred to as such herein to distinguish embodiments of sound-attenuating devices including a lofting element from those that may not include a lofting element. A lofting element 602C may be removably coupled, permanently coupled, or formed integrally with the body 614C. The lofting element may have various heights 612C and widths 610C. The height 612C and width 610C may be determined as discussed above in FIG. 6A and may further depend on a cross-sectional geometry of the interior transition regions discussed herein. The lofting element 602C further includes an aperture 606C extending the height 612C thorough the lofting element 602C such that the lofting element 602C is fluidly coupled to the body 614C to allow exhaust to pass through. In one example, as shown in FIG. 6C, the width 610C is the same as a largest diameter 604C of the sound-attenuating device 600C. In other examples, as discussed herein, the width 610C is greater than a largest diameter 604C of the sound-attenuating device 600C. In other examples, as discussed herein, the width 610C is smaller than a largest diameter 604C of the sound-attenuating device 600C.

The lofting element 602C may further include a coupling region 608C, including one or more coupling mechanisms (not shown) which may include mechanical, magnetic, chemical, electric, adhesive, or other means of coupling. The lofting coupling region 608C may be used instead of or in addition to the coupling regions discussed in FIGS. 5A-5E to secure the sound-attenuating device 600C to an exhaust system, as discussed above. The lofting element 602C may have various cross-sectional shapes. As shown in FIG. 6C, the lofting element 602C has a polygonal, in this example rectangular, cross-sectional shape. In other examples, the lofting element 602C, or other lofting elements as discussed herein may have other polygonal, triangular, elliptical, or combination shaped cross-sections.

FIG. 6D shows a sound-attenuating device 600D which includes a body 614D. The body 614D has the same features as discussed above in the sound-attenuating device of 500D discussed in FIG. 5D above but is referred to as such herein to distinguish embodiments of sound-attenuating devices including a lofting element from those that may not include a lofting element. A lofting element 602D may be removably coupled, permanently coupled, or formed integrally with the body 614D. The lofting element may have various heights 612D and widths 610D, which may be determined as discussed above in FIGS. 6A-6C. The lofting element 602D further includes an aperture 606D extending the height 612D thorough the lofting element 602D such that the lofting element 602D is fluidly coupled to the body 614D to allow exhaust to pass therethrough. In one example, as shown in FIG. 6D, the width 610D is smaller than a largest diameter 604D of the sound-attenuating device 600D. In other examples, as discussed herein, the width 610D is greater than a largest diameter 604D of the sound-attenuating device 600D. In other examples, as discussed herein, the width 610D is about the same as a largest diameter 604D of the sound-attenuating device 600D.

The lofting element 602D may further include a coupling region 608D, including one or more coupling mechanisms (not shown) which may include mechanical, magnetic, chemical, electric, adhesive, or other means of coupling. The lofting coupling region 608D may be used instead of or in addition to the coupling regions discussed in FIGS. 5A-5E to secure the sound-attenuating device 600D to an exhaust system, as discussed above. The lofting element 602D may have various cross-sectional shapes. As shown in FIG. 6D, the lofting element 602D has a polygonal, in this example rectangular, cross-sectional shape. In other examples, the lofting element 602D, or other lofting elements as discussed herein may have other polygonal, triangular, elliptical, or combination shaped cross-sections.

Figure 6E:
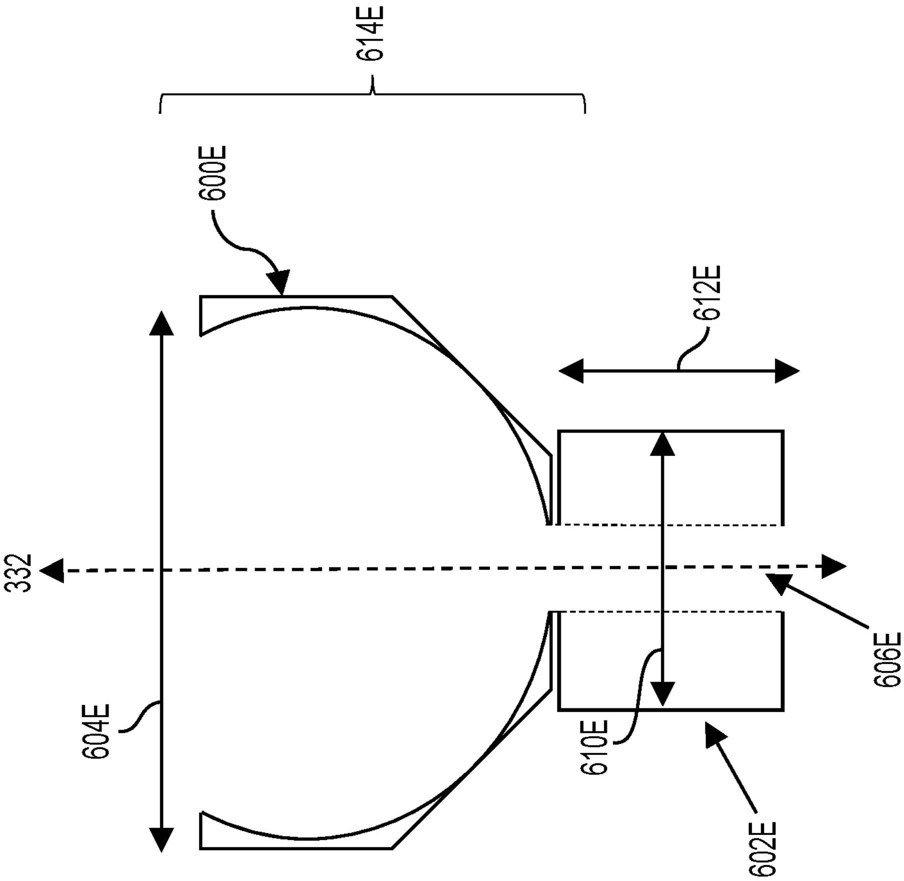

FIG. 6E shows a sound-attenuating device 600E which includes a body 614E. The body 614E has the same features as discussed above in the sound-attenuating device of 500E discussed in FIG. 5E above but is referred to as such herein to distinguish embodiments of sound-attenuating devices including a lofting element from those that may not include a lofting element. A lofting element 602E may be removably coupled, permanently coupled, or formed integrally with the body 614E. The lofting element may have various heights 612E and widths 610E which may be determined by a variety of factors as discussed above in at least FIGS. 6A-6C. The lofting element 602E further includes an aperture 606E extending the height 612E thorough the lofting element 602E such that the lofting element 602E is fluidly coupled to the body 614E to allow exhaust to pass therethrough. In one example, as shown in FIG. 6E, the width 610E is smaller than a largest diameter 604E of the sound-attenuating device 600E. In other examples, as discussed herein, the width 610E is greater than a largest diameter 604E of the sound-attenuating device 600E. In other examples, as discussed herein, the width 610E is about the same as a largest diameter 604E of the sound-attenuating device 600E.

The lofting element 602E may further include a coupling region 608E, including one or more coupling mechanisms (not shown) which may include mechanical, magnetic, chemical, electric, adhesive, or other means of coupling. The lofting coupling region 608E may be used instead of or in addition to the coupling regions discussed in FIGS. 5A-5E to secure the sound attenuating device to an exhaust system, as discussed above. The lofting element 602D may have various cross-sectional shapes. As shown in FIG. 6E, the lofting element 602E has a polygonal, in this example rectangular, cross-sectional shape. In other examples, the lofting element 602E, or other lofting elements as discussed herein may have other polygonal, triangular, elliptical, or combination shaped cross-sections.

The lofting element (602A, 602B, 602C, 602D, and 602E) may be included in the sound-attenuating devices (600A, 600B, 600C, 600D, and 600E) for a variety of reasons. For example, a lofting element may be used when an additional exhaust path (duct) is desirable. In another example, the lofting element may be used to further direct the exhaust at a predetermined angle. In yet another example, the lofting element may be used to shift the sound-attenuating device both vertically and horizontally, for example, to direct the exhaust in a predetermined direction relative to the container.

INDUSTRIAL APPLICABILITY

Industrial equipment, including industrial power generation equipment such as gas turbines, generate exhaust and the related soundwaves, resulting in measurable sound pressure levels. These soundwaves exit the exhaust system in a mushroom-cloud arrangement, causing the area around the industrial equipment to be noisy. The sound pressure levels generated by exhaust gas release may not only be irritating to those nearby, but may also violate local, state, federal, or other noise ordinances or other ordinances. These noise ordinances may include restrictions including sound pressure level alone or in combination with one or more of a time of day, time of year, length of operation, and/or other factors or combinations of factors. The sound-attenuating devices discussed herein capture the sound waves generated by industrial equipment such as gas turbine engines. The sound waves are captured and re-directed by the sound-attenuating device, thus reducing the perceived sound pressure level, such that the gas turbine system would be able to run for an increased amount of time, and/or during certain times of day or year during which it otherwise may not be able to operate without the sound-attenuating device.

In some examples, the sound-attenuating device(s) discussed herein may be removably coupled to industrial equipment that is mobile. For example, a power generation unit mounted to a vehicle such as a tractor-trailer that enables the power generation unit to be moved and set up rapidly. This movement and rapid setup may be desirable, for example, in case of a natural disaster or in a remote location such as an oil and gas platform or a geographic location currently without utilities due to, for example, disaster or lack of development. There may be varying rules, regulations, standards, or other requirements for noise generation (e.g., noise ordinances) depending upon where the mobile unit may be positioned. In this example, the sound-attenuating device may be removably coupled and uncoupled, and optionally positioned at an angle other than 90 degrees from the container's top surface, to reduce a sound pressure level perceived at a predetermined distance and in a predetermined direction relative to the noise-generating source (e.g., the exhaust system). This enables the efficient and effective management of noise generation in a variety of geographic locations with varying restrictions without compromising the functionality nor the mobility of the gas turbine engine or other system to which the sound-attenuating device is removably coupled.

In one example, when the sound pressure level is discussed as being reduced in a predetermine direction at a predetermined distance, one or both of the predetermined direction or distance may be stated as a range. In one example, the predetermined direction is measured perpendicular to a top of the container. In another example, the predetermined direction is measured relative to a direction in which the sound-attenuating device is directing the exhaust. The predetermined distance and sound pressure level measurement are discussed above in at least FIG. 3C. Thus, while utilizing the sound-attenuating device(s) discussed herein, a sound pressure level perceived may be such that local, state, federal, or other noise restrictions and/or requirements are satisfied. As discussed herein, the sound pressure level may be measured on a logarithmic scale. In some examples, the sound-attenuating device may reduce the sound pressure level by from about 10% to about 90%. In other examples, the sound-attenuating device may reduce the sound pressure level by from about 20% to about 80%. In still other examples, the sound-attenuating device may reduce the sound pressure level by from about 30% to about 60%.

Figure 7:
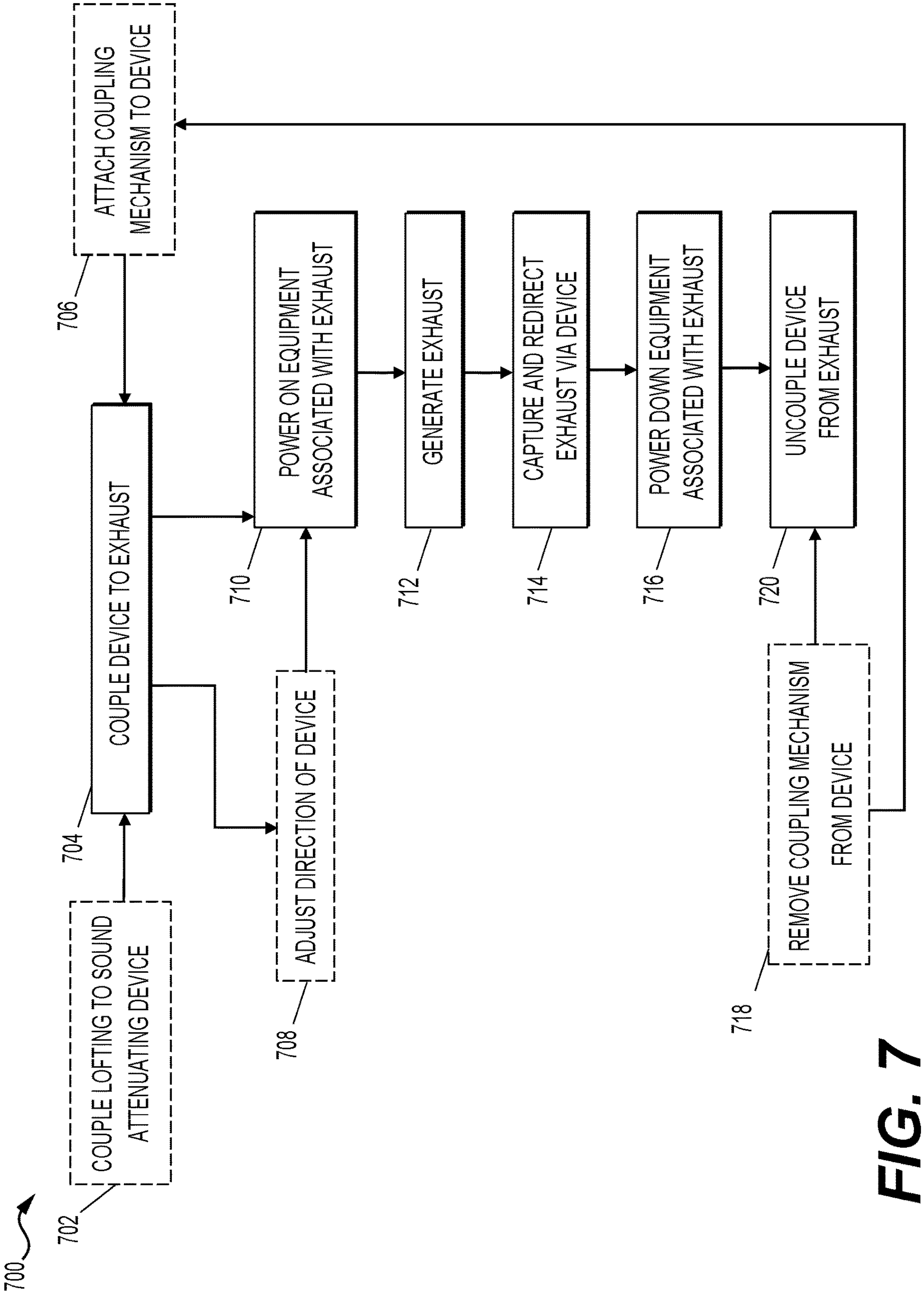
FIG. 7 is a flowchart of a method of use of a sound-attenuating device, according to embodiments of the present disclosure.

FIG. 7 illustrates a flow chart of an example method 700 of use of a sound-attenuating device according to embodiments of the present disclosure. At optional operation 702, a lofting element may be removably coupled to the sound-attenuating device and/or the container and/or the exhaust system, for example, via a duct of the exhaust system. The lofting element, as discussed above, may provide additional height to the sound-attenuating device that may, in some examples of various environments, exhaust types, and/or exhaust volumes, be advantageous to the reduction of sound pressure level generated by the exhaust system as perceived at a predetermined direction and distance from the exhaust system. In other examples, the lofting element may be integrally formed with the sound-attenuating device or may be included in the container and/or exhaust system.

At operation 704, the sound-attenuating device is removably coupled to the exhaust system. This removable coupling at operation 704 may be performed once when the sound-attenuating device is introduced to the exhaust system, wherein the sound-attenuating device remains coupled to the exhaust system in between moves of the industrial equipment (including gas turbine engine systems). In other examples, such as when operation 720, as discussed below, is performed, the removable coupling at operation 704 may occur more than one, for example, each time the use of the sound-attenuating device is desired.

In some examples, at operation 706, prior to coupling the sound-attenuating device to the exhaust system, one or more coupling mechanisms may be attached. The coupling mechanisms may be positioned in one or more of the coupling regions discussed herein on the sound-attenuating device. In one example, the one or more coupling mechanisms may be attached from the sound-attenuating device directly or indirectly to the exhaust system. In another example, the one or more coupling mechanisms may be attached from the sound-attenuating device directly or indirectly to the container. In yet another example, the one or more coupling mechanisms may be attached to the sound-attenuating device such that it is configured to hold itself in place without being further coupled to either of the exhaust system nor the container. In still another example, the one or more coupling mechanisms may be attached to two or more of the container, the exhaust system, or the sound-attenuating device to secure the sound-attenuating device in place.

At optional operation 708, a direction of the sound-attenuating device may be adjusted. In one example, the sound-attenuating device is configured to release exhaust at an angle perpendicular to the top of a container surrounding the industrial system. In another example, the sound-attenuating device is adjusted at operation 708 to release exhaust at an angle other than 90 degrees with respect to the top of the container. This may be desirable depending upon what permanent or removable obstacles or population concentrations and/or distributions are present in a measurement region such as the measurement region 334 discussed in FIG. 3C above.

At operation 710, the industrial equipment to which the sound-attenuating device is removably coupled is powered on. In one example, this equipment may be a stationary or mobile gas turbine engine configured to generate exhaust at operation 712. At operation 714, the exhaust generated at operation 712 is captured by the sound-attenuating device and discharged in a predetermined direction. In one example, the predetermined direction may be perpendicular to the top of the container, along the central axis discussed herein, for example, in FIGS. 5A-5E. In another example, the predetermined direction may be at an angle up to and including being perpendicular to the container, relative to a central axis of the exhaust duct as discussed herein. A direction other than perpendicular to the container, along the central axis of the exhaust system may be employed, for example, if there is a desire to angle the exhaust and sound pressure level thus produced by the exhaust, away from persons or structures that may be directly above the container. The sound-attenuating device may thus reduce the sound pressure level experienced in the predetermined direction and at a predetermined distance from the exhaust system to below a noise or other operational ordinance or restriction.

At operation 716, the equipment generating the exhaust captured and redirected by the sound-attenuating device is powered down, ceasing to continue to generate exhaust. At optional operation 718, the coupling mechanism may be removed from the sound-attenuating device. At operation 720, the sound-attenuating device is uncoupled from the exhaust. In examples where operation 718 is executed, optional operation 706 may be executed the next time the sound-attenuating device is employed.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of fuel injection system. Hence, although the present embodiments are, for convenience of explanation, depicted and described as being implemented in a gas turbine engine, it will be appreciated that it can be implemented in various other types of engines and machines with fuel injectors, and in various other systems and environments. Furthermore, there is no intention to be bound by any theory presented in any preceding section. It is also understood that the illustrations may include exaggerated dimensions and graphical representation to better illustrate the referenced items shown and are not considered limiting unless expressly stated as such.

What is claimed is:

1. A sound-attenuating device, comprising:
- a first end having a first aperture;
- a second end having a second aperture smaller than the first aperture;
- a sidewall defining the first aperture and the second aperture;
- an interior transition region, at least partially formed by the sidewall, configured to reduce a sound pressure level, wherein the interior transition region is a curved and diverging surface that is adjacent to the second end; and
- a coupling region comprising at least one coupling mechanism, extending from an outside surface of the sidewall adjacent to the second end, configured to couple directly to an exhaust-generating source.

2. The sound-attenuating device of claim 1,
wherein the first aperture and the second aperture are coaxially located along a central axis of the sound-attenuating device.

3. The sound-attenuating device of claim 1,
wherein the least one coupling mechanism extends through the sidewall from an inside surface of the sidewall to the outside surface.

4. The sound-attenuating device of claim 1,
wherein the at least one coupling mechanism comprises a plurality of coupling mechanisms positioned circumferentially around the outside surface of the sidewall.

5. The sound-attenuating device of claim 1,
wherein the interior transition region is rounded and extends circumferentially around an inside surface of the sidewall.

6. The sound-attenuating device of claim 1, wherein the interior transition region is configured to generate a lamellar flow of exhaust.

7. The sound-attenuating device of claim 1, wherein the interior transition region forms a parabolic cross-sectional shape, an elliptical shape, or a partial-elliptical shape.

8. The sound-attenuating device of claim 1, wherein the interior transition region extends from an end of the sidewall to an end of the second end.

9. A system, comprising:

an exhaust-generating device;

a duct system including at least one duct, the at least one duct being coupled to the exhaust-generating device; and a sound-attenuating device coupled to the exhaust-generating device, wherein the sound-attenuating device comprises:

a first end having a first aperture;

a second end having a second aperture smaller than the first aperture;

a sidewall defining the first aperture and the second aperture;

an interior transition region, at least partially formed by the sidewall, configured to reduce a sound pressure level of the system, wherein the interior transition region is a curved and diverging surface that is adjacent to the second end; and a coupling region comprising a coupling mechanism, extending from an outside surface of the sidewall, configured to couple directly to the exhaust-generating device.

10. The system of claim 9, wherein the exhaust-generating device is configured to release exhaust associated with a first sound pressure level, and the sound-attenuating device is configured to reduce the first sound pressure level to a second sound pressure level.

11. The system of claim 10, wherein each of the first sound pressure level and the second sound pressure level are measured at a predetermined distance from the sound-attenuating device.

12. The system of claim 10, wherein the second sound pressure level is from about 15% to about 75% of the first sound pressure level at a predetermined distance from the sound-attenuating device.

13. A gas turbine system, comprising:

a gas turbine engine;

an exhaust system coupled to the gas turbine engine; and a sound-attenuating device coupled to and extending from the exhaust system, wherein the sound-attenuating device comprises:

a first end having a first aperture;

a second end having a second aperture smaller than the first aperture;

a sidewall defining the first aperture and the second aperture;

an interior transition region, at least partially formed by the sidewall, configured to reduce sound pressure levels emitted by the gas turbine system, wherein the interior transition region is a curved and diverging surface that is adjacent to the second end; and a coupling region, comprising a plurality of coupling mechanisms, extending from an outside surface of the sidewall adjacent to the second end, configured to couple directly to the exhaust system.

14. The gas turbine system of claim 13, wherein at least one coupling mechanism of the plurality of coupling mechanisms is configured to removably couple the sound-attenuating device to the exhaust system.

15. The gas turbine system of claim 13, further comprising:

a container positioned around at least the gas turbine system and the exhaust system.

16. The gas turbine system of claim 15, further comprising:

a combustor coupled to the gas turbine engine, wherein the container is further positioned around the combustor.

17. The gas turbine system of claim 16, further comprising:

a compressor coupled to the combustor, wherein the container is further positioned around the compressor.

18. The gas turbine system of claim 13, wherein the exhaust system is configured to emit exhaust associated with a first sound pressure level, the sound-attenuating device being configured to reduce the first sound pressure level to a second sound pressure level.

19. The gas turbine system of claim 18, wherein the second sound pressure level is from about 5% to 90% of the first sound pressure level at a predetermined distance from the sound-attenuating device.

20. The gas turbine system of claim 13, wherein the plurality of coupling mechanisms comprises a coupling mechanism on the second end.

* * * * *